United States Patent
Gupta et al.

(10) Patent No.: US 12,423,923 B1
(45) Date of Patent: Sep. 23, 2025

(54) OPTIMIZING THE TIMING OF INTELLIGENT FACILITATION

(71) Applicant: Meta Platforms Technologies, LLC, Menlo Park, CA (US)

(72) Inventors: Aakar Gupta, Redmond, WA (US); Difeng Yu, Carlton (AU); Ruta Parimal Desai, Mountlake Terrace, WA (US); Tanya Renee Jonker, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 353 days.

(21) Appl. No.: 18/068,433

(22) Filed: Dec. 19, 2022

Related U.S. Application Data

(60) Provisional application No. 63/315,140, filed on Mar. 1, 2022, provisional application No. 63/291,749, filed on Dec. 20, 2021.

(51) Int. Cl.
  *G06T 19/00* (2011.01)
  *G06F 3/01* (2006.01)

(52) U.S. Cl.
  CPC ............ *G06T 19/006* (2013.01); *G06F 3/013* (2013.01); *G06F 3/017* (2013.01)

(58) Field of Classification Search
  None
  See application file for complete search history.

(56) References Cited

U.S. PATENT DOCUMENTS

| | | | | |
|---|---|---|---|---|
| 2014/0354550 | A1* | 12/2014 | Mendonca | G06F 3/02 345/168 |
| 2019/0034038 | A1* | 1/2019 | Rudchenko | G06F 3/013 |

OTHER PUBLICATIONS

Difeng Yu, et al.; "Optimizing the Timing of Intelligent Suggestion in Virtual Reality;" 2022; In Proceedings of the 35th Annual ACM Symposium on User Interface Software and Technology (UIST '22). pp 1-2;. https://doi.org/10.1145/3526113.3545632 (Year: 2022).*

* cited by examiner

*Primary Examiner* — Peter Hoang
(74) *Attorney, Agent, or Firm* — Morgan, Lewis & Bockius LLP

(57) ABSTRACT

The disclosed computer-implemented method may include systems and methods for optimizing the timing of when intelligent selection suggestions are provided within a VR/AR environment. In one example, the systems and methods described herein determine a probability that a potential action within a user interface is an intended action; quantify, over a period of time, a value of suggesting the potential action within the user interface; select a time at which to suggest the potential action based on the quantified value over the period of time; and suggest the potential action within the user interface at the selected time. Various other methods, systems, and computer-readable media are also disclosed.

20 Claims, 24 Drawing Sheets

| Time | | An Earlier Suggestion | | A Later Suggestion | |
|---|---|---|---|---|---|
| | $t_1$ | | $t_2$ | | |
| Item 1: ... | 5% ... | 36% ... | 46% ... | 80% ... | 100% |
| Item 2: ... | 6% ... | 32% ... | 4% ... | 4% ... | 0% |
| Item 3: ... | 10% ... | 0% ... | 1% ... | 6% ... | 0% |
| Item 4: ... | 15% ... | 0% ... | 0% ... | 10% ... | 0% |
| Item 5: ... | 20% ... | 0% ... | 0% ... | 0% ... | 0% |

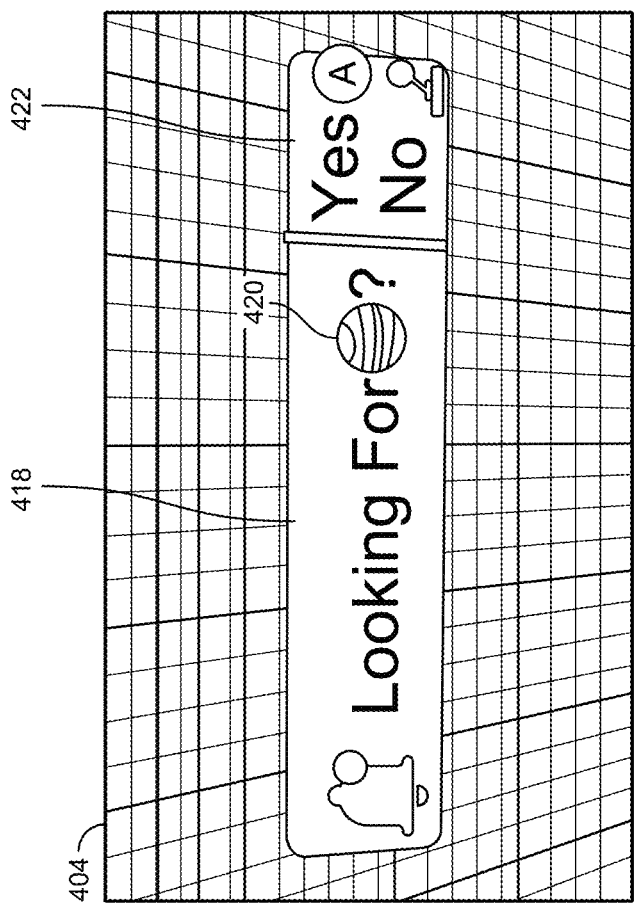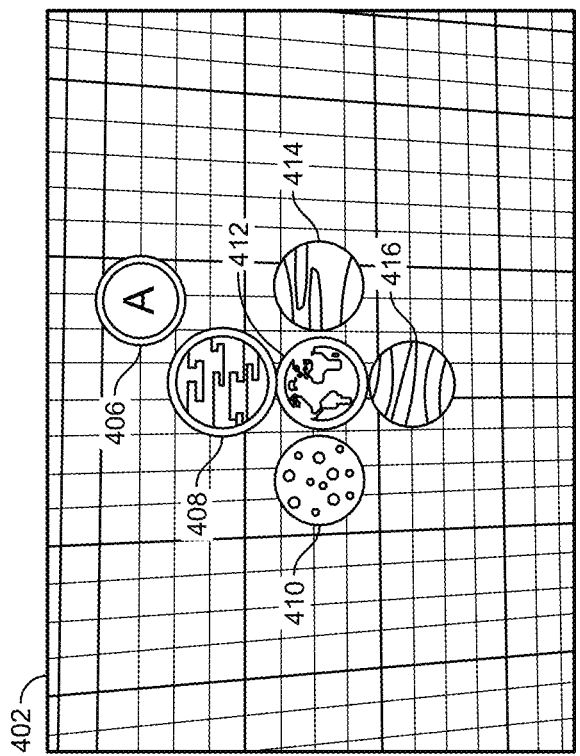
FIG. 4

| Task Type | Suggestion Method | Response Time | Response Rate | Delayed Time |
|---|---|---|---|---|
| Pointing | Highlighting | $0.90 + 0.83 * h(1.19 - x)$ | $0.97 - 0.24 * h(x - 1.02)$ | $0.01 - 1.08 * h(x - 1.96)$ |
| Pointing | Pop-up Notification | $1.13 + 0.13 * h(x - 1.60)$ | $1.00 - 0.24 * h(x - 0.98)$ | $0.57 - 2.25 * h(x - 2.52)$ |
| Text Matching | Highlighting | 2.91 | 0.90 | $0.66 + 0.84 * h(x - 1.29)$ |
| Text Matching | Pop-up Notification | 1.47 | $0.96 - 0.03 * h(x - 3.90)$ | $4.94 - 0.61 * h(7.13 - x)$ |

| | Task Type | Strategy (Threshold) | Time Saved (Std.) | % of Improvement |
|---|---|---|---|---|
| Validation | Pointing | Optimal Thresholding (0.47) | 0.4073s (0.3169s) | 44.07% |
| | Pointing | Heuristic Thresholding (0.85) | 0.2827s (0.3597s) | 0% |
| | Text Matching | Optimal Thresholding (0.98) | 1.5822s (1.7991s) | 268.38% |
| | Text Matching | Heuristic Thresholding (0.50) | 0.4295s (1.1225s) | 0% |
| Test | Pointing | Optimal Thresholding (0.47) | 0.4073s (0.3202s) | 39.39% |
| | Pointing | Heuristic Thresholding (0.85) | 0.2922s (0.3645s) | 0% |
| | Text Matching | Optimal Thresholding (0.98) | 1.6211s (1.7946s) | 260.89% |
| | Text Matching | Heuristic Thresholding (0.50) | 0.4492s (1.1440s) | 0% |

FIG. 9

| | Task Type | Strategy (Threshold) | Usage Percentage (Std.) | % of Improvement |
|---|---|---|---|---|
| Validation | Pointing | Optimal Thresholding (0.81) | 65.85% (17.70%) | 0.64% |
| | Pointing | Heuristic Thresholding (0.85) | 65.43% (20.24%) | 0% |
| | Text Matching | Optimal Thresholding (0.96) | 87.33% (18.44%) | 50.72% |
| | Text Matching | Heuristic Thresholding (0.50) | 57.94% (15.85%) | 0% |
| Test | Pointing | Optimal Thresholding (0.81) | 65.69% (18.30%) | 0.36% |
| | Pointing | Heuristic Thresholding (0.85) | 65.45% (20.42%) | 0% |
| | Text Matching | Optimal Thresholding (0.96) | 87.17% (18.53%) | 51.52% |
| | Text Matching | Heuristic Thresholding (0.50) | 57.53% (15.63%) | 0% |

FIG. 10

| | Task Type | Strategy (Threshold) | Time Saved (Std.) | % of Improvement |
|---|---|---|---|---|
| Validation | Pointing | RL PPO-MLP | 0.4078s (0.3253s) | 44.25% |
| | Pointing | RL ACER-LSTM | 0.4079s (0.3354s) | 44.29% |
| | Text Matching | RL PPO-MLP | 1.5673s (1.7878s) | 265.91% |
| | Text Matching | RL ACER-LSTM | 1.5275s (1.7418s) | 240.05% |
| Test | Pointing | RL PPO-MLP | 0.4087s (0.3285s) | 39.87% |
| | Pointing | RL ACER-LSTM | 0.4084s (0.3362s) | 39.77% |
| | Text Matching | RL PPO-MLP | 1.6050s (1.7877s) | 257.30% |
| | Text Matching | RL ACER-LSTM | 1.5671s (1.7328s) | 248.86% |

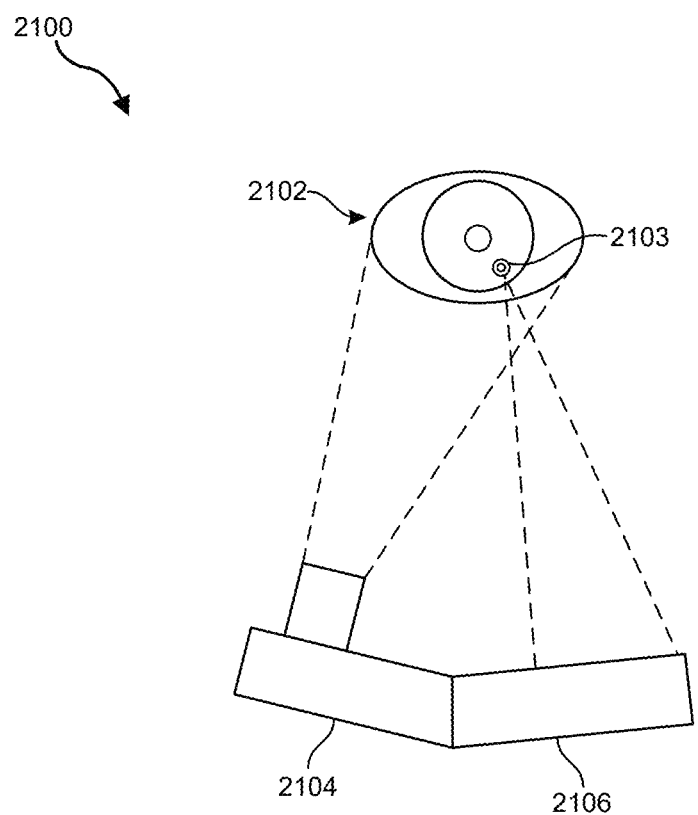
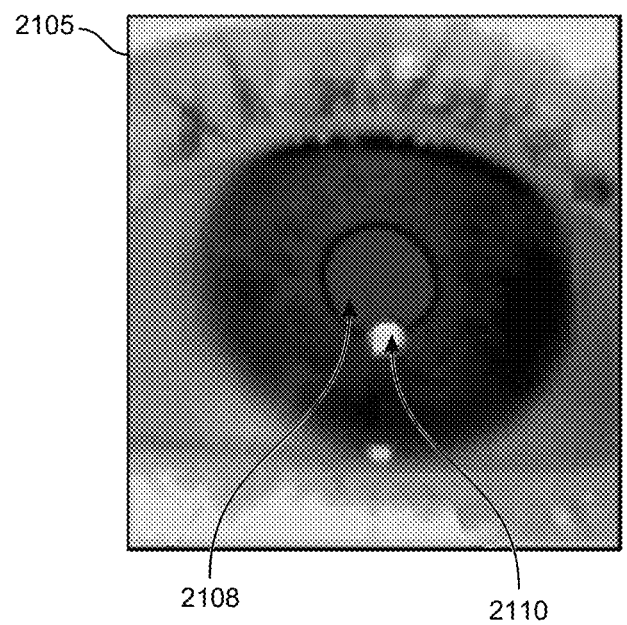
FIG. 21

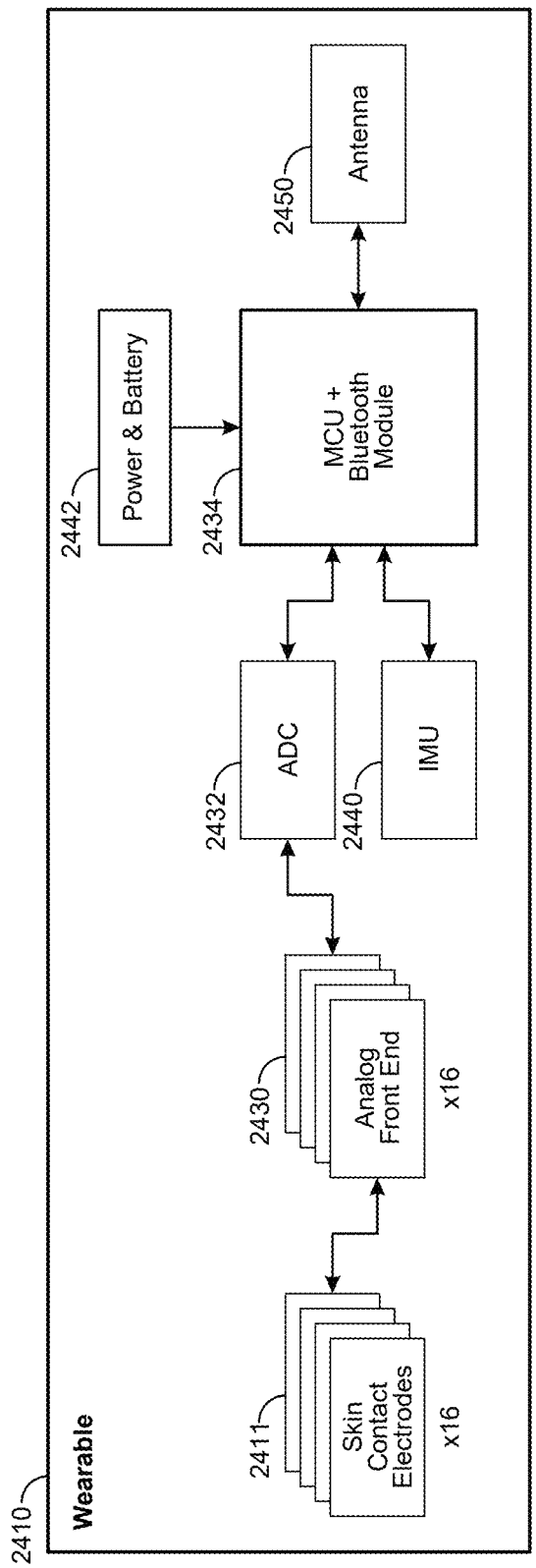
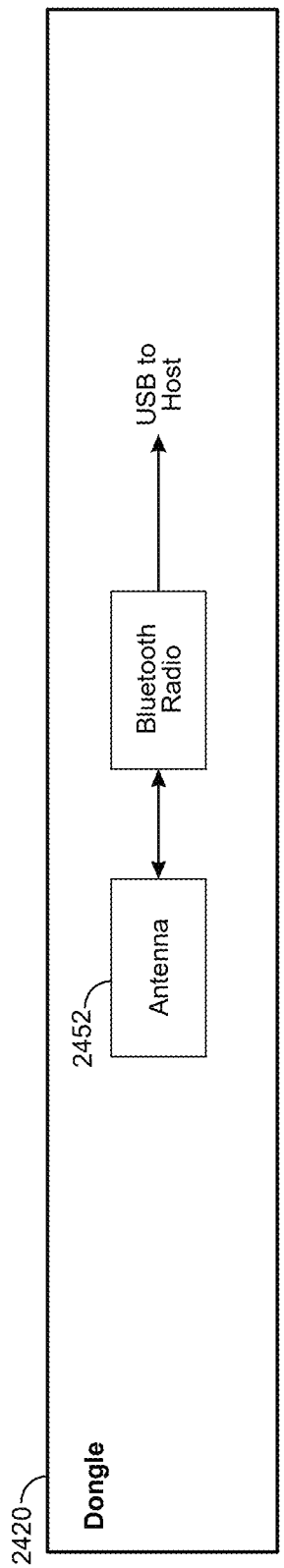
FIG. 24A
FIG. 24B

OPTIMIZING THE TIMING OF INTELLIGENT FACILITATION

CROSS REFERENCE TO RELATED APPLICATION

This application claims the benefit of U.S. Provisional Application No. 63/291,749, filed 20 Dec. 2021, and of U.S. Provisional Application No. 63/315,140, filed 1 Mar. 2022, the disclosures of which are incorporated, in their entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

FIG. 4 illustrates example suggestion methods for intelligent facilitation.

FIG. 7 illustrates an example table containing a summarization of the modeling results from FIG. 6.

FIG. 9 illustrates an example table containing validation and testing results of optimal thresholding and heuristic thresholding on time saved for users.

FIG. 10 illustrates an example table containing validation and testing results of optimal thresholding and heuristic thresholding on suggestion usage percentage.

FIG. 12 illustrates an example table containing validation and testing results of reinforcement learning (RL) regarding time saved for users.

FIG. 21 is a more detailed illustration of various aspects of the eye-tracking subsystem illustrated in FIG. 20.

FIGS. 24A and 24B are illustrations of an exemplary schematic diagram with internal components of a wearable system.

Figure 1:
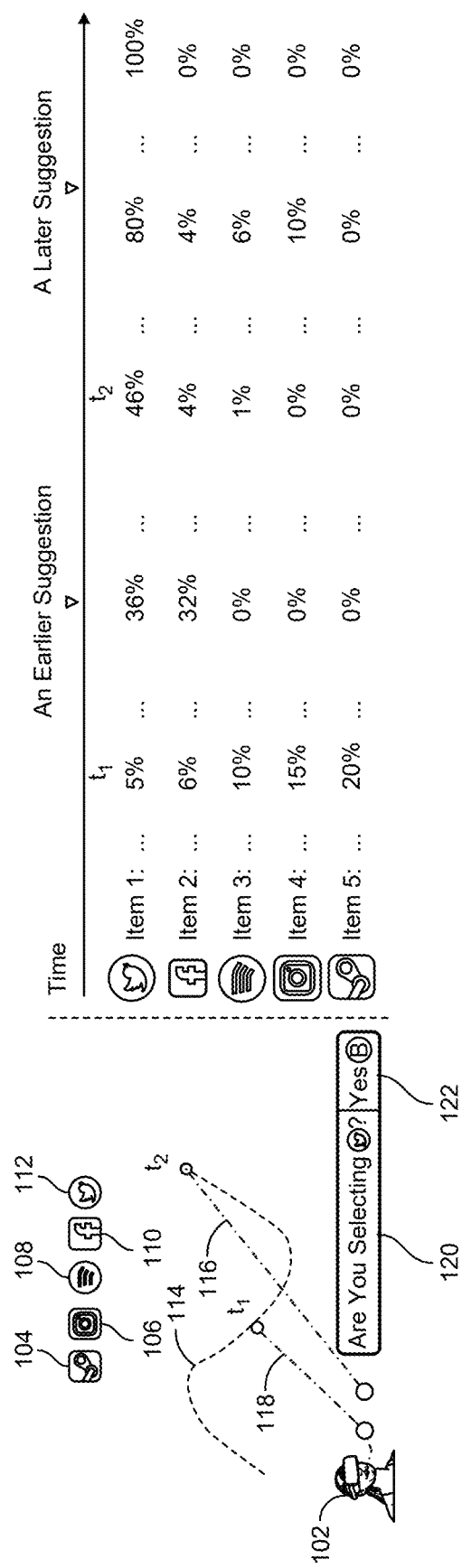
FIG. 1 illustrates an overview of an example intelligent facilitation timing problem.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Intelligent facilitation techniques based on target prediction models can enable low-friction selection input for user interfaces, such as those in virtual reality ("VR") or augmented reality ("AR") systems. Such a technique may leverage the probabilistic estimations from a target prediction model and provide users with a shortcut for selecting the most probable target via intelligent suggestions (e.g., visual highlighting). However, it may be challenging to determine the timing of showing an intelligent suggestion. An earlier suggestion, if correct, can save user effort and boost performance, but a prediction model may be unsure about users' intent earlier in the task. While a model may have more confidence in producing an accurate outcome with a later suggestion, the facilitation will be less beneficial as users have spent more time and effort on the task.

To deal with this trade-off, the present disclosure describes systems and methods to determine the optimal timing of intelligent facilitation through a computational approach that accounts for user-centric costs and benefits. As will be described in greater detail here, these systems and methods may be effective to determine the optimal timing of intelligent facilitation in various interaction scenarios and given various optimization objectives.

Systems and methods described herein may apply probabilistic models (using, e.g., statistical and/or machine learning approaches) to predict a user's intended target of interest. Based on the estimated likelihood of selecting different items/objects, a promising solution to enhance object selection may be intelligent facilitation. As used herein, the term "intelligent facilitation" may refer to any method providing a user with assistance within a user interface based on one or more predictions and/or evaluations of a user's potential intent and/or projected future actions within the user interface. Thus, for example, an intelligent facilitation method may suggest to a user the target within the user interface that is most likely the user's intended target and may provide the user with a shortcut of selecting the target.

Intelligent facilitation methods described herein may provide suggestions to a user with respect to any of a variety of types of target. Examples of targets may include, without limitation, interface elements (e.g., virtual objects, icons, selection elements, and any other elements with which a user may interact in a user interface), gestures, tasks, interactions, and action sequences. In general, as used here, potential objects of a target may be referred to as "actions" by a user within the user interface.

Intelligent facilitation methods described herein may suggest a target within a user interface to a user in any manner suitable to the target. For example, these methods may suggest a target by visually indicating the target (by, e.g., highlighting the target, visually enhancing the target, visually isolating the target, pointing toward the target, animating the target, visually representing the target, visually representing an effect of the target, etc.). In other examples, these methods may suggest a target by indicating the target with sound, with haptics, and/or with any other form of interface output to the user. In general, the methods described herein may suggest the target in any manner that indicates the target to the user (e.g., that picks out and/or uniquely identifies the target to the user).

Intelligent facilitation methods described herein may provide any suitable type of shortcut to the target. In general, a shortcut may include an input that is simpler, quicker, more reliable, easier to execute, less cognitively or emotionally demanding to execute, less sensitive to precision, less analog, physically more comfortable, less noisy, lower-friction, with fewer steps, and/or preferred by a user relative to an action to which the shortcut is an alternative. As an example, a shortcut may be allowing a user to select a target with a simple click rather than pointing toward the target with their hand.

In some examples, the methods described herein may highlight the target and provide a shortcut to the target with the same underlying mechanism. For example, these methods may increase the size of the target, thereby both visually highlighting the target and simplifying the input required to select the target.

As can be appreciated, intelligent facilitation methods such as those described herein may alleviate the need for manual pointing in VR/AR interfaces and can potentially lead to quicker, easier, and more comfortable interaction. These methods may be useful for VR/AR interactions that employ noisy and/or high-friction input modalities (e.g., mid-air hand pointing) and/or scenarios that require users to complete labor/mental-demanding tasks such as selecting objects in a cluttered environment or navigating through a complex hierarchical menu.

As mentioned above and will be described in greater detail below, target prediction models described herein may determine a user's intended target within a user interface (e.g., which interface element the user intends to select). In addition, as will be described in greater detail below, systems and methods described herein may determine the timing of providing intelligent facilitation to a user. In determining the timing, these systems and methods may account for and balance various factors. For example, an earlier suggestion, if correct, may save user effort and boost performance. But the prediction model may be less certain about a user's intent in an early stage—and an incorrect suggestion may cause user frustration, decrease performance, and/or hamper user experience. On the other hand, a later suggestion may be less beneficial as a user has spent more time and effort on the task, but the model will have more confidence in producing an accurate estimation. To deal with this trade-off, the systems and methods described herein may implement an optimization strategy to maximize the potential benefit from intelligent facilitation techniques by displaying the suggestion at the correct timing.

The systems and methods described herein may determine the timing of intelligent facilitation computationally by accounting for user-centric costs and benefits. Specifically, these systems and methods may take the probability estimation of the target prediction model as an input and quantify the cost and benefit of a suggestion over time to produce a final gain function. The obtained gain function may then allow systems and methods described herein to determine when displaying a suggestion will be useful and when the value of showing that suggestion will be maximized. Additionally or alternatively, the obtained gain function may be provided to one or more interface designers who may, in turn, calibrate the user timing of intelligent facilitation within the user interface accordingly.

As mentioned above, the systems and methods described herein may determine the timing of intelligent facilitation for any of a variety of user interfaces and actions within user interfaces. Among other examples, the present disclosure describes a pointing task and a text matching task in VR. High-friction input techniques such as mid-air pointing may benefit from the systems and methods of intelligent facilitation described herein. As will be described in greater detail below, the systems and methods described herein may have one or more optimization objectives for selecting timing of intelligent facilitation. Examples of optimization objectives include, without limitation, minimizing user task completion time and maximizing intelligent suggest usage. In addition, these systems and methods may use one or more optimization strategies toward the optimization objectives. Examples of optimization strategies include, without limitation, optimal thresholding and reinforcement learning.

According to one example, the systems and methods described herein may use one or more probabilistic models to estimate a user-intended target (e.g., for selection facilitation). In addition, these systems and methods may use reinforcement learning for facilitating timing optimization.

Selection facilitation techniques may improve user performance for actions within a user interface. In some examples, systems and methods described herein may decrease the movement distance for selecting a target and/or increase the effective size of the target. Shortening the movement distance, may include snapping a cursor to the target. Increasing the target size may include expanding the target and/or resizing the cursor. These systems and methods may provide a visual indicator (such as visual highlighting) once a candidate target is acquired. These systems and methods may then activate facilitation with an explicit confirmation action (e.g., a button press) for the user to access the object under selection.

Some selection techniques described herein may predict user-intended targets. In addition to decreasing distance and increasing size, intention inference-based methods may also help reduce user search time. While a user may have trouble finding the intended target in more complex interaction environments (e.g., with lots of visual clutter), an "intelligent" suggestion may present the potential target to users, thus minimizing the time of searching and manual pointing.

Systems and methods described herein may determine a user's intended target within a user interface through behavioral cues such as body and eye movements (e.g., as sensed by a body tracking system and/or an eye tracking system). In some examples, systems described herein may build and/or use models that use appropriate gaze traces/scanpaths to predict selection intention. For example, these systems and methods may build and/or use models for predicting a search target based on gaze fixations on an array of potential targets. One rationale may be that attention and gaze may be guided toward visual features that are similar to the search target. In some examples, systems and methods described herein may use a support vector machine (SVM) model to predict a user's intended target. In some examples, systems and methods described herein may use gaze fixations to anticipate user hand movements.

In some examples, systems and methods described herein may use hand/input device trajectories to infer user-intended targets. Systems and methods described herein may take advantage of prediction models that generate probability estimations about the likelihood of a candidate object to be the user's intended target.

In some examples, systems and methods described herein may use contextual information, including, e.g., a user's preceding actions, as input to models for predicting user intent within the user interface. In some examples, these systems and methods may use interaction contexts (such as previous tasks performed within the user interface) to predict a user's short-term interests, and, thus, a user's immediate intents.

Generally, the systems described herein may use any suitable target prediction model for predicting a user's target within a user interface (e.g., estimating which target is most likely and/or assigning a probability to one or more potential targets).

Systems and methods described herein may apply one or more reinforcement learning (RL) techniques. In some examples, the systems and methods described herein may use a model-free RL technique to discover an optimal policy of suggestion timing by simulating users' responses to an intelligent suggestion. In one example, the reward function of the RL technique may integrate user-centric costs and benefits in terms of, for example, the amount of time saved by the user.

FIG. 1 illustrates an overview of an example intelligent facilitation timing problem. A user 102 may be trying to select one of the five icons 104, 106, 108, 110, and 112 in a VR environment. A target prediction model estimates the likelihood of a user selecting each candidate item over time (e.g., at timestamp $t_1$ and $t_2$). Based on the predicted probability, an intelligent facilitation technique may display an intelligent suggestion 120 and enable the user to select the most probable target with a shortcut 122. However, the target prediction model may not determine when an intelligent suggestion should be displayed to maximize the user's expected benefit. An expected gain curve 114 shows that a suggestion 116 at time $t_2$ may be more beneficial to the user in expectation than a suggestion 118 at time $t_1$. Thus, systems and methods described herein may determine the timing so that in probability, the correct trade-off between an earlier (more beneficial in terms of saving users' time and effort) but unconfident suggestion and a later (less useful) but more confident suggestion is made.

The systems and methods described herein may optimize the timing of intelligent facilitation by accounting for the cost and benefit that an intelligent suggestion with a specific timing may entail for the user. In some examples, these systems and methods may take an input probability estimation from a target prediction model and user-centric costs and benefits of a suggestion over time to form a final gain function. These methods may then determine the optimized suggestion timing may be then determined by finding the spot with the maximum gain on this gain function curve. Thus, in various examples, the systems and methods described herein may make use of a target prediction model (to estimate a user's intended target within the user interface), a cost and benefit quantification method, and a gain function optimization method.

Figure 2:
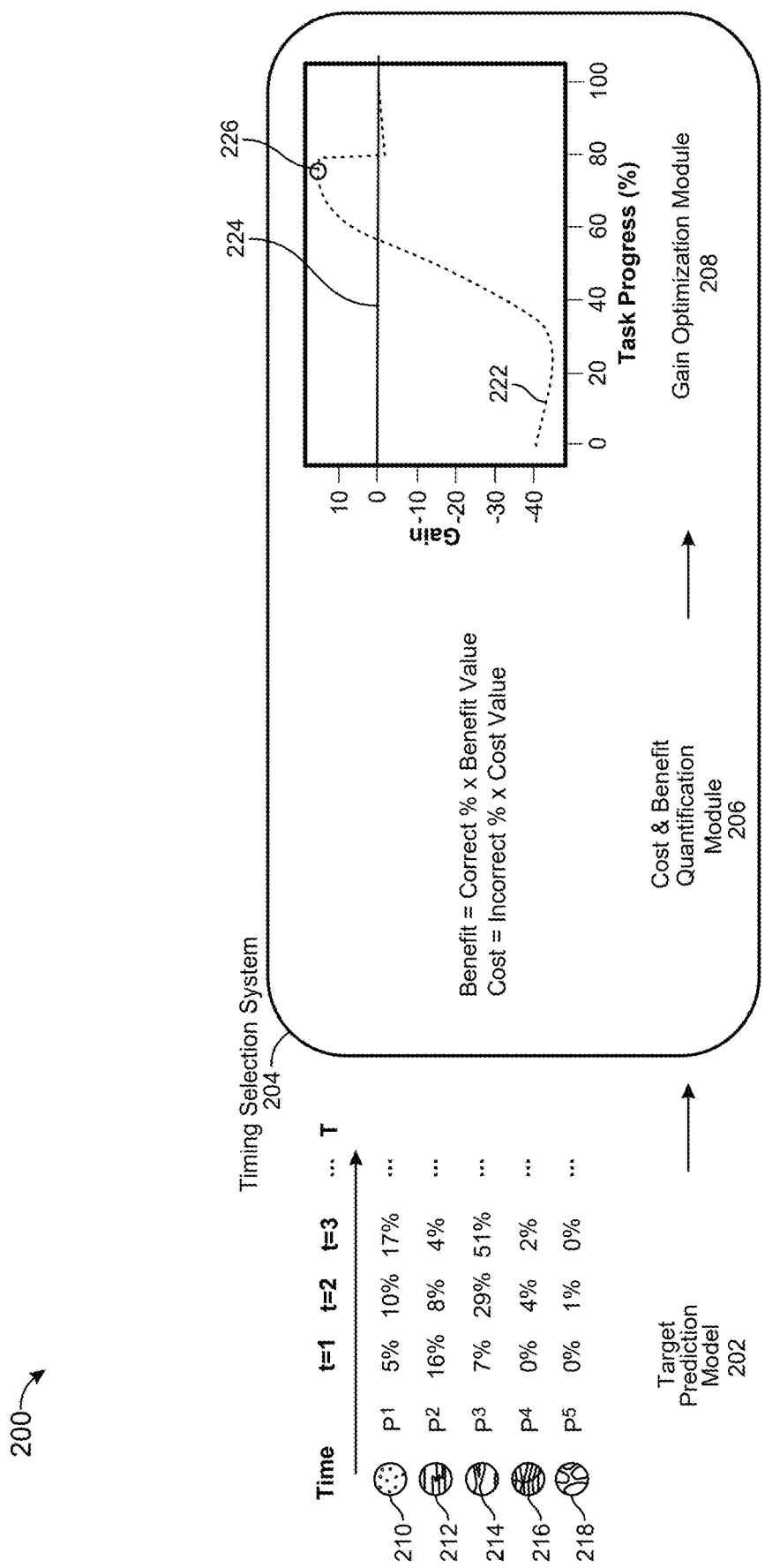
FIG. 2 illustrates an overview of an example system for optimizing timing of intelligent facilitation.

FIG. 2 illustrates an overview of an example system 200 for optimizing timing of intelligent facilitation. As shown in FIG. 2, system 200 may include a target prediction model 202 and a timing selection system 204. Timing selection system 204 may include a cost and benefit quantification module 206 and a gain optimization module 208. Target prediction module 202 may estimate, across time, the probability that each of potential targets 210, 212, 214, 216, and 218 within a user interface are the user's intended target. System 200 may provide the probability estimates of target prediction model 202 as input to timing selection system 204. Cost and benefit quantification module 206 may use the probability estimates of target prediction model 202 in evaluating the expected benefit and the expected cost of suggesting one (or more) of targets 210, 212, 214, 216, and 218 to the user. Gain optimization module 208 may use the cost and benefit information generated by cost and benefit quantification module 206 over time to produce a gain function 222. For example, gain optimization module 208 may calculate gain function 222 by, for each point in time, subtracting the expected cost of providing a suggestion from the suggested benefit of providing a suggestion. Gain optimization module 208 may apply an optimization strategy to determine when displaying a suggestion will be useful (gain exceeds a threshold 224, e.g., 0) and when the gain value (max (gain)) will be maximized based on the gain function, as shown at point 226 of gain function 222.

The target prediction models described herein may be probabilistic models to infer a user's intended target of interested in a user interface. In some examples, the target prediction model may produce a probability distribution $\{p_t^k\}$ among N potential candidates, which indicates the likelihood of a user selecting each candidate $k \in K = \{1, \ldots, N\}$ at timestamp t (e.g., as shown in relation to target prediction model 202 of FIG. 2). The target prediction model may then output the candidate that may be most likely to be the target and the corresponding probability value $q_t$ (also called the model confidence). Timestamp $t \in \{1, \ldots, T\}$, where T may be the total number of timestamps for which the model produces estimations until the user manually selects a target. In some examples, the target prediction model may produce outputs in a constant frequency $f$. Therefore, timestamp t may be converted to time in seconds $t_s$ using $t_s = t/f$.

Systems and methods described herein may train the target prediction model using data collected from various information channels in relation to the user interface (e.g., user hand movement, eye gaze information, prior selection information, etc.). These systems and methods may use the output of the target prediction model (probability estimates over time) as the input for a timing selection system that determines the timing for suggesting the target to the user. In some examples, the systems and methods described herein may only evaluate potential suggestions regarding the most probable target (and, thus, use only using only the model confidence $q_t$ as the input for the timing selection system). In some examples, these systems and methods may evaluate potential suggestions for multiple possible targets (and, so, provide the whole probability distribution from the target prediction model as input for the timing selection system).

Systems and methods described herein may use the quantification of the user-centric costs and benefits of displaying an intelligent suggestion over time based on an optimization objective. Example factors included in the cost and benefit quantification may include, without limitation, minimizing user task completion time, an estimation on how long it takes users to respond to suggestions, how much time a correct suggestion may help save, and how much time delay an incorrect suggestion may cause. In some examples, systems and methods described herein may generate estimates of benefits and costs to users based on the historical activity of the user in question and/or of other users of the system. Additionally or alternatively, these systems and methods may use estimates of benefits and costs provided externally (e.g., based on empirical user studies or literature-informed estimates). The systems described herein may thus implement a cost function Cost(t) and benefit function Benefit(t) used in the construction of a final gain function.

The total gain of displaying an intelligent suggestion of the most probable object at a particular timestamp t may be shown in Equation 1. The gain function may be explained as the benefit multiplies the probability of the most probable object being the actual target minuses the cost multiplies the likelihood of it not being the real target.

$$\text{Gain}(t)=\text{Benefit}(t) \cdot q_t - \text{Cost}(t) \cdot (1-q_t) \quad (1)$$

The optimization objectives and cost and benefit quantification methods described herein may vary in different applications according to design considerations. Without limiting the possible optimization objectives, two examples include time-saved for users and suggestion usage percentage.

In some examples, systems and methods described herein may use task completion time with a user interface as a proxy for task performance. These systems and methods may assist in shortening the task completion time within a user interface (e.g., while maintaining accuracy) to increase user efficiency. For maximizing the time saving for users, the following three variables may be considered when displaying an intelligent suggestion at timestamp t:

Response time RT(t): the time elapsed between the first appearance of a correct suggestion and the time when the user applies the suggestion (e.g., through a simple click).

Response rate RR(t): the overall user response rate to a correct suggestion.

Delayed time DT(t): the averaged time delay caused by displaying an incorrect suggestion. Delayed time may represent time lost by the user.

For a given trial with total timestamps T, the potential benefit of displaying a suggestion at t may be represented in Equation 2. The equation may be interpreted as the estimated timestamps saved if given a correct suggestion at t multiplies the rate of response. The max function ensures the benefit value may be no smaller than 0.

$$\text{Benefit}(t)=\max(0, T-(t+RT(t))) \cdot RR(t) \quad (2)$$

The potential cost may be simply the time delay caused by an incorrect prediction (Equation 3).

$$\text{Cost}(t)=DT(t) \quad (3)$$

By plugging in Equation 2 and 3 into Equation 1, there is an estimated gain function regarding timestamps saved for users (Equation 4). It may be converted to time in seconds-saved for users by dividing it with model output frequency f.

$$\text{Gain}(t)=\max(0, T-(t+RT(t))) \cdot RR(t) \cdot q_t - DT(t) \cdot (1-q_t) \quad (4)$$

Thus, in some examples the systems and methods described herein may use the gain function defined in Equation 4 (or an equivalent) when determining timing for suggesting targets within a user interface.

Another value of intelligent interfaces may be to lower users' input friction, which includes mental and physical effort in completing a task, rather than performance improvement alone. Even when a suggestion feature within an interface may impair average task speed, users may still prefer to use the feature. In some examples, "user friction" may be approximated through intelligent suggestion usage percentage by assuming that as long as users apply a suggestion, physical and mental effort will be saved.

Based on this rationale, the gain function may be written as Equation 5. The benefit function may be approximated by the likelihood of users responding to a correct suggestion. (The probability of users applying an incorrect suggestion is ignored in this formulation, but may be incorporated in other examples.)

$$\text{Gain}(t)=RR(t) \cdot q_t \quad (5)$$

The gain function Gain(t) changes over time: both the model confidence value $q_t$ and the user-centric cost Cost(t) and benefit Benefit(t) will be different as the task progress-related factor t changes. However, as mentioned earlier, the only input from the target prediction model to the timing selection system may be the real-time model confidence value $q_t$. In other words, the task progress t may be unknown in real applications. Systems and methods described herein may therefore convert t to $q_t$ through a mapping function $t=g(q_t)$, so that the objective function (Equation 6) only depends on the real-time confidence output $q_t$. The objective function returns the $q_t$ that leads to the maximum gain.

$$\underset{q_t \in [0,1]}{\text{argmax}} \; \text{Gain}(g(q_t)) = \underset{q_t \in [0,1]}{\text{argmax}} \; [\text{Benefit}(g(q_t)) \cdot q_t - \text{Cost}(g(q_t)) \cdot (1-q_t)] \quad (6)$$

The solution of obtaining the mapping function $t=g(q_t)$ may be through a training dataset $D_{train}$. The purpose of $D_{train}$ may be to provide known relationships between t and $q_t$ so that an optimization strategy may learn how to handle new real-time $q_t$ values. In some examples $D_{train}$ may contain numerous data trials. For each data trial, there may be known $q_t$ values for all $t \in \{1, \ldots, T\}$. Such a $D_{train}$ may be generated by refitting the data trials for training the target prediction model (e.g., hand and gaze movement positions for $t \in \{1, \ldots, T\}$) to the trained prediction model itself to produce $q_t$ for each $t \in \{1, \ldots, T\}$. With $D_{train}$ and the cost and benefit functions, an optimization strategy may calculate the expected gain by simulating the effect of intelligent facilitation at different $q_t$ (which corresponds to a known t) on the data trials to discover an optimal solution on $D_{train}$. With the assumption that the training data may be a reasonable approximation of the unseen testing data, the optimized solution may be generalized.

Systems and methods described herein may apply any of a variety of optimization methods to solve the problem of finding a $q_t$ or a set of $q_t$s that may lead to the maximum gain. Examples of optimization methods that these systems and methods may apply include, without limitation, optimal thresholding and reinforcement learning.

The optimal thresholding strategy may aim to obtain a single optimized model confidence threshold that works the best on $D_{train}$. To achieve this aim, different confidence values $q_t \in [0, 1]$ may be tested and the $q_t$ that leads to the highest expected gain on $D_{train}$ may be selected.

Rather than relying on a single threshold for all the trials, an RL-based optimization strategy may provide "dynamic thresholds" based on the profile of each trial (e.g., the speed of increase of the model confidence value). This may potentially future boost the optimization performance. Therefore, RL may be applied to derive optimal policies for intelligent facilitation that may reach the optimal gain on $D_{train}$.

Figure 3:
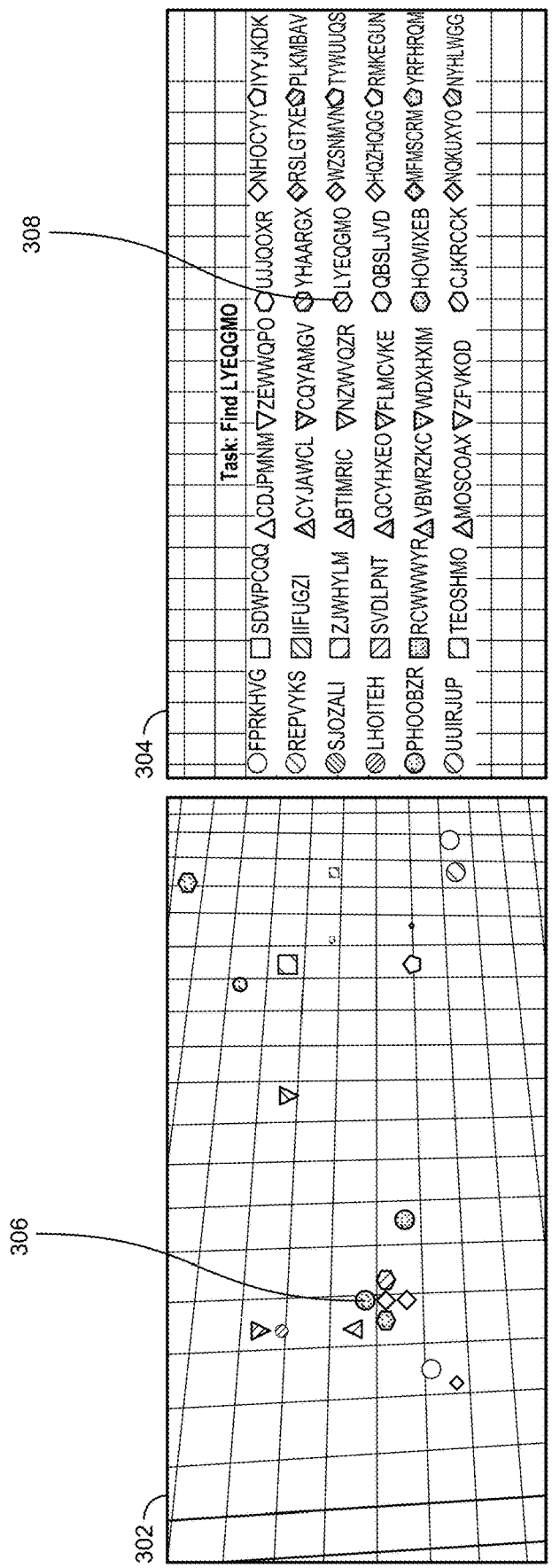
FIG. 3 illustrates example tasks to which optimization of intelligent facilitation timing is applied.

FIG. 3 illustrates example tasks to which optimization of intelligent facilitation timing is applied. As shown in FIG. 3, a task 302 may include selecting an interface object 306 within a VR user interface with a pointing gesture. A task 304 may include finding matching text within a VR user interface by selecting an interface object 308.

In one example, task 302 may be a potentially physically demanding task, requiring a user to select a small target 306 within a dense cluster of interface elements. For example, the angular size of target 306 may be 1°. Furthermore, target 306 may be placed in a location that is initially out of view, requiring a user to rotate their head. By providing an accurate suggestion of target 306 in a timely manner, the systems and methods described herein may aid a user in completing task 302 more quickly and with less physical effort.

In one example, task 304 may be a mentally demanding task, requiring a user to visually search through candidate strings of text to find a matching string. By providing an accurate suggestion of target 308 in a timely manner, the systems and methods described herein may aid a user in completing task 304 more quickly without unnecessarily compounding mental effort.

FIG. 4 illustrates example suggestion methods for intelligent facilitation. As shown in FIG. 4, a suggestion method 402 may include displaying a suggestion in context. Thus, interface elements 408, 410, 412, 414, and 416 are shown in context within the user interface. Systems described herein may suggest interface element 408 by highlighting (e.g., circling) interface element 408. In addition, these systems may display a shortcut indicator 406 next to interface element 408, further highlighting interface element 408 and indicating the shortcut (the 'A' button on a VR controller) to select interface element 408. In some examples, systems and methods described herein may provide an option within the user interface to reject the suggestion (e.g., with another simple input, such as right tilting a joystick on the VR controller).

As shown in FIG. 4, a suggestion method 404 may include displaying a pop-up element 418. Pop-up element 418 may show a representation 420 of the target. Additionally or alternatively, pop-up element 418 may provide a shortcut 422 with instructions for selecting (or rejecting) the suggested target. In some examples pop-up element 418 may appear in the user's current viewing direction (rather than, e.g., in the context of the suggested target).

Figure 5:
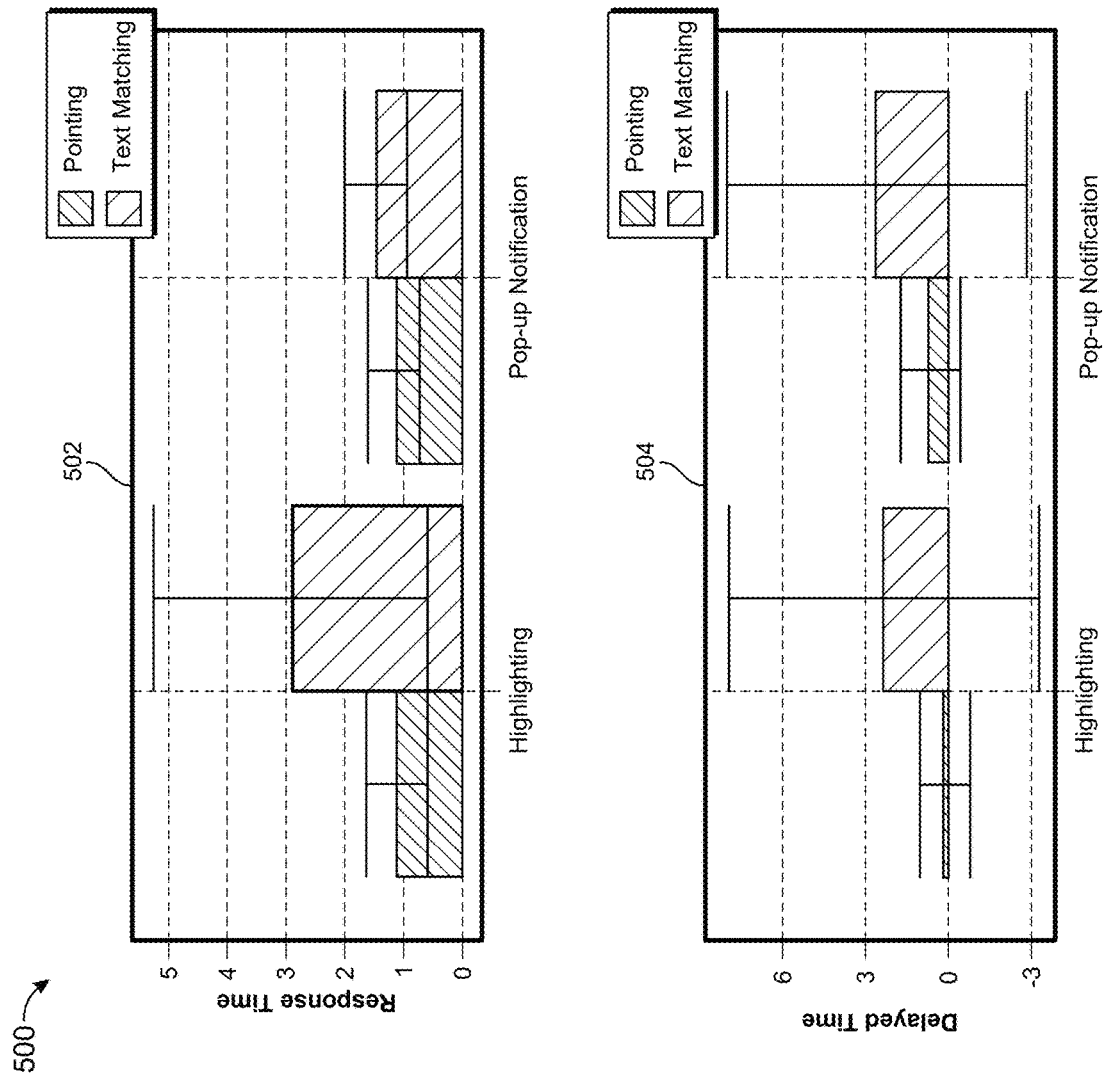
FIG. 5 illustrates example expected response time and delayed time regarding different suggestion methods and task types.

FIG. 5 illustrates example expected response time and delayed time regarding different suggestion methods (highlighting and pop-up notification) and task types (pointing and text matching). In the shown graphs 502 and 504, the error bars may represent mean±std.

Thus, for example, graph 502 shows an example expected response time for the pointing and text matching tasks shown in FIG. 3 in conjunction with the highlighting-based and pop-up-notification-based suggestions shown in FIG. 4. As mentioned earlier, response time may be the time elapsed between the appearance of a correct intelligent suggestion and a user's acceptance of that suggestion via a provided shortcut, and delayed time may be the expected delay caused to the user when providing an incorrect suggestion. As can be appreciated from FIG. 4, both the expected response time and the expected delayed time may vary based on the task and/or based on the suggestion method. In addition, Accordingly, systems and methods described herein may differentiate between task type when making determinations about the timing of suggestions. Additionally or alternatively, these systems and methods may provide suggestions in different formats depending on the task type and/or may make differing determinations about the timing of suggestions based on the format in which suggestions are provided.

Figure 6:
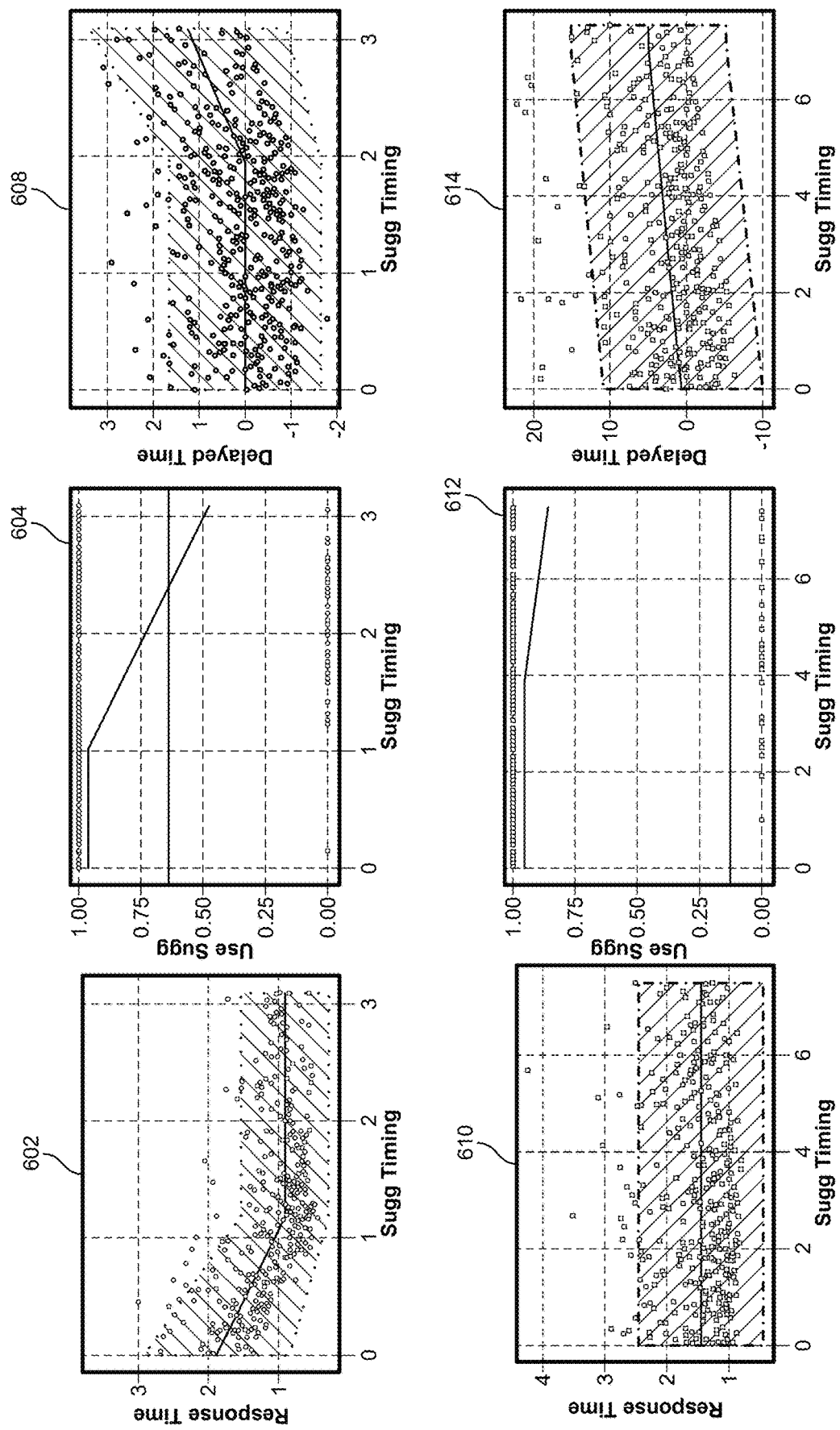
FIG. 6 illustrates examples of modeling results regarding response time, response rate, and delayed time.

FIG. 6 illustrates examples of modeling results regarding response time, response rate, and delayed time. The dots represent the data trials, the black lines are model fitting results provided by MARS, and the ribbons indicate 95% confidence interval. Graphs 602, 604, and 608 show linear regression lines relating to data points for a pointing task with a highlighting suggestion type. Graph 602 illustrates a relationship between suggestion timing and response time. Graph 604 illustrates a relationship between suggestion timing and suggestion usage rate. Graph 608 illustrates a relationship between suggesting timing and delayed time.

Similarly, graphs 610, 612, and 614 show linear regression lines relating to data points for a text matching task and a pop-up notification suggestion type. Graph 610 illustrates a relationship between suggestion timing and response time. Graph 612 illustrates a relationship between suggestion timing and suggestion usage rate. Graph 614 illustrates a relationship between suggestion timing and delayed time.

As can be appreciated from FIG. 6, the value of suggestions with different timings to a user may vary based on task type and suggestion type. Accordingly, in some examples the systems and methods described herein may use different suggestion types and/or different suggestion timings based on the task type. In some examples, these systems and methods may model past user data (e.g., of a particular user and/or of a group of users) to generate cost and benefit information of suggestion timings for one or more task types and/or one or more suggestion types. For example, these systems and methods may model the relationship between suggestion timing and response time, delayed time and/or suggestion usage rates. Additionally or alternatively, these systems and methods may use such models to set one or more parameters of a cost and benefit quantification module. In one example, these systems and methods may use MARS to model one or more relationships.

MARS tries to find multiple linear regression lines to fit the data while balancing goodness-of-fit and simplicity. Linear regression lines may be connected through hinge functions ($h(x-c)=\max(0, x-c)$ or $h(c-x)=\max(0, c-x)$ where c may be a constant called knot) to provide non-linear approximations of the data. In one example, a maximum number of terms may be set (e.g., two maximum terms).

FIG. 7 illustrates an example table 700 containing a summarization of the modeling results from FIG. 6. As shown in FIG. 7, the systems and methods described herein may model factors relating to the value of different timings of suggestions within a user interface (e.g., with hinged linear regression lines). Additionally or alternatively, these systems and methods may use such models as parameters of a cost and benefit quantification module (e.g., to evaluate potential timings of suggestions for a particular task type and/or a particular suggestion method), and/or to select a preferred suggestion method for a given task type.

Figure 8:
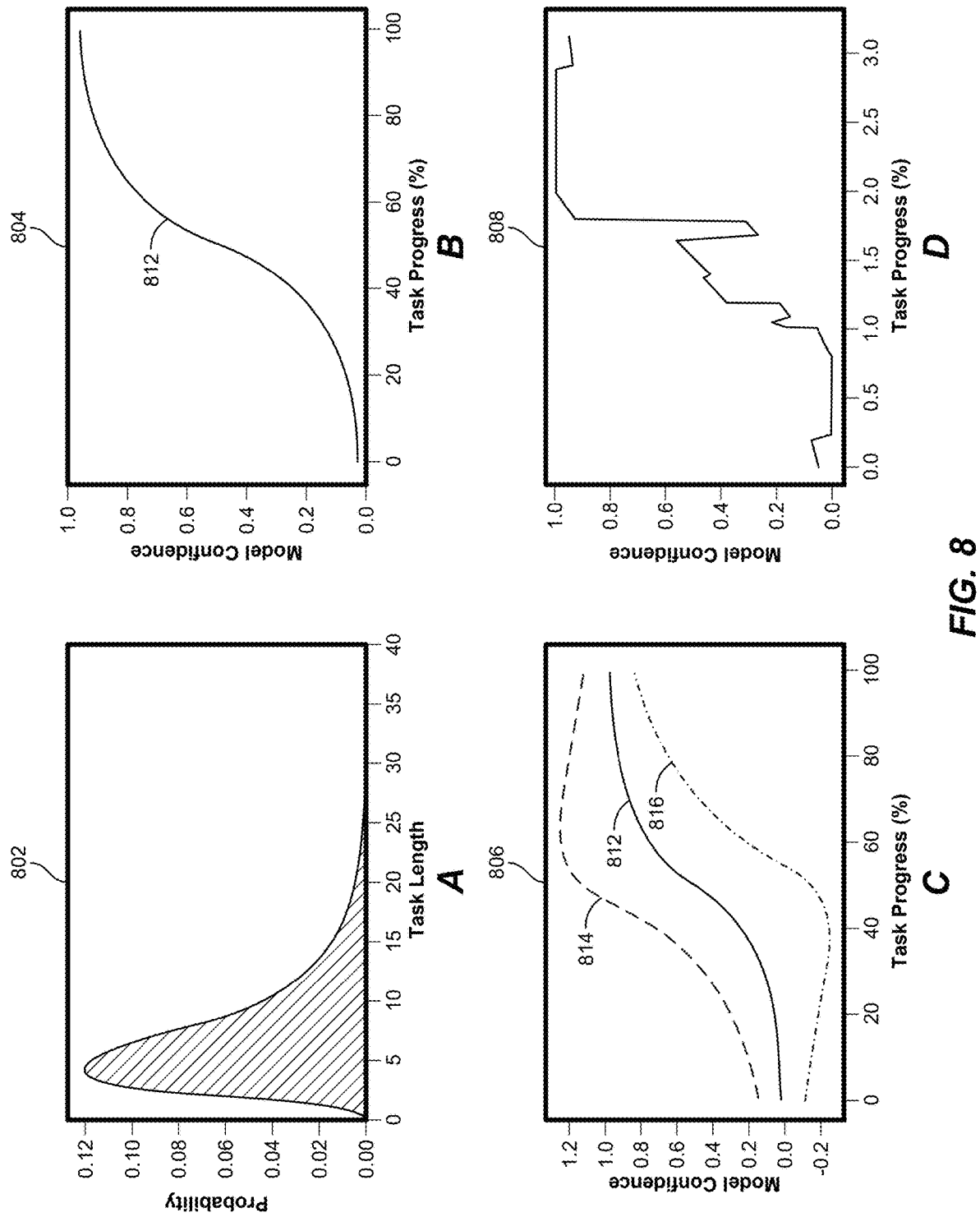
FIG. 8 illustrates changes in model confidence over time for predicting a target.

FIG. 8 illustrates changes in model confidence over time for predicting a target. As shown in FIG. 8, a graph 802 shows the probability distribution of the time taken for a given task. A graph 804 shows a global centerline 812 of the confidence curve for predicting the target as the task is nearer completion. A graph 806 shows global centerline 812 with a 95% confidence interval (shown by an upper bound 814 and a lower bound 816) for deviations of local centerlines of any given instance of a task. A graph 808 shows the confidence curve for predicting the target as the task is nearer completion for a single instance of the task.

Global centerline 812 may approximate a sigmoid function $y_1$=sigmoid (x, k, $x_0$, u, l) where k may be the logistic growth rate, $x_0$ may be the sigmoid's midpoint, u may be the upper bound, and l may be the lower bound (Equation 7).

$$y_1 = \frac{u-l}{1+e^{-k(x-x_0)}} + l \quad (7)$$

The area of deviation for a local centerline may be approximated by a Bell curve $y_2$=bell (x, $\mu$, $\sigma$) (Equation 8). The distance between a randomly selected local centerline $y_3$ and the global centerline may be probabilistically described by a Gaussian distribution following Equation 9, where $\mu_r$ and $\sigma_r$ are predefined mean and standard deviation of the Gaussian distribution.

$$y_2 = \frac{1}{\sigma\sqrt{2\pi}} e^{\frac{-(x-\mu)^2}{2\sigma^2}} \quad (8)$$

$$y_3 = y_1 + y_2 \cdot \text{random} \cdot \text{gauss}(\mu_r, \sigma_r) \quad (9)$$

FIG. 9 illustrates an example table 900 containing validation and testing results of optimal thresholding and heuristic thresholding on time saved for users. As shown in FIG. 9, different thresholds may be used for determining intelligent suggestion timing based on target prediction confidence. In some cases, a heuristic threshold may be used (e.g., a confidence level that is selected according to a user interface designer's judgment based on available knowledge, intuition, and points of comparison). In other cases, an "optimal" threshold (as determined by the systems and methods described herein) may be used. As shown in FIG. 9, the amount of time spent by the user may be improved when the optimal thresholds are adopted.

FIG. 10 illustrates an example table 1000 containing validation and testing results of optimal thresholding and heuristic thresholding on the rate of usage of suggestions. As shown in FIG. 10, suggestion usage rates may also improve when the optimal thresholds are adopted.

Figure 11:
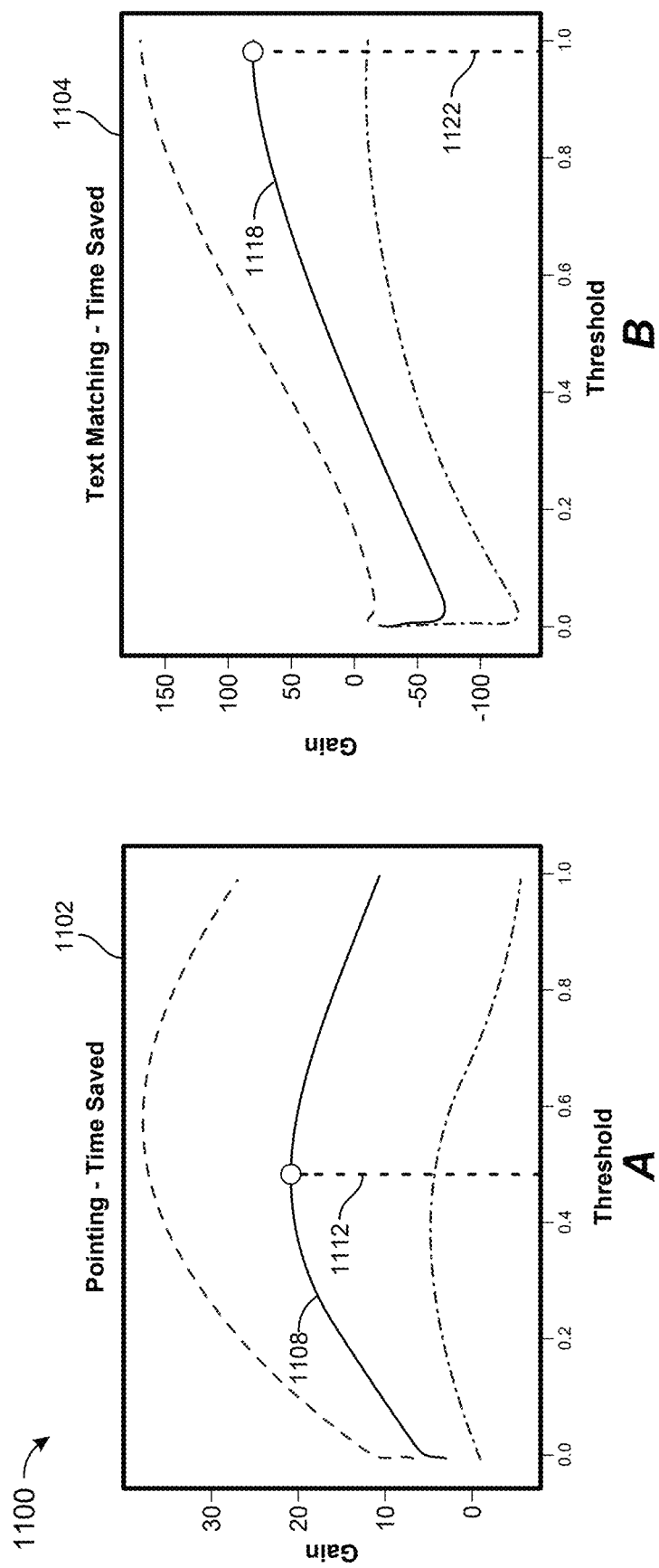
FIG. 11 illustrates an example expected gain for maximizing the time saving for users if using different confidence thresholds.

FIG. 11 illustrates an example expected gain for maximizing the time saving for users (y-axis) if using different confidence thresholds (x-axis). The unit of gain may be a timestamp, where time saved in seconds=0.02·timestamps. The dash lines represent mean±std. As shown in FIG. 11, a graph 1102 shows how a gain curve 1108 of the time-saved condition for a pointing task varies over changes to the confidence threshold $q_r$. A graph 1104 shows how a gain curve 1118 of the time-saved condition for a text matching task varies over changes to the confidence threshold $q_r$. As seen in FIG. 11, an optimal confidence threshold 1112 for the pointing task may differ substantially from an optimal confidence threshold 1122 for the text matching task.

FIG. 12 illustrates an example table 1200 containing validation and testing results of reinforcement learning regarding time saved for users. As shown in FIG. 12, the systems and methods described herein may use any of a variety of reinforcement learning algorithms, including, without limitation, Proximal Policy Optimization (PPO2), Actor Critic with Experience Replay (ACER), Deep Q (DQN), and Advanced Actor Critic (A2C). In addition, these systems and methods may use any of a variety of policies, including, without limitation, Multi-Layer Perceptron (MLP) policies and Long Short-Term Memory (LSTM) policies. Table 1200 shows results of reinforcement learning using a PPO2 algorithm with an MLP policy ("RL PPO-MLP") and using an ACER algorithm with an LSTM policy ("RL ACER-LSTM"). As shown in FIG. 12, various reinforcement learning approaches implementing the methods described herein may provide improvements over heuristic-based confidence thresholds for intelligent facilitation.

Figure 13:
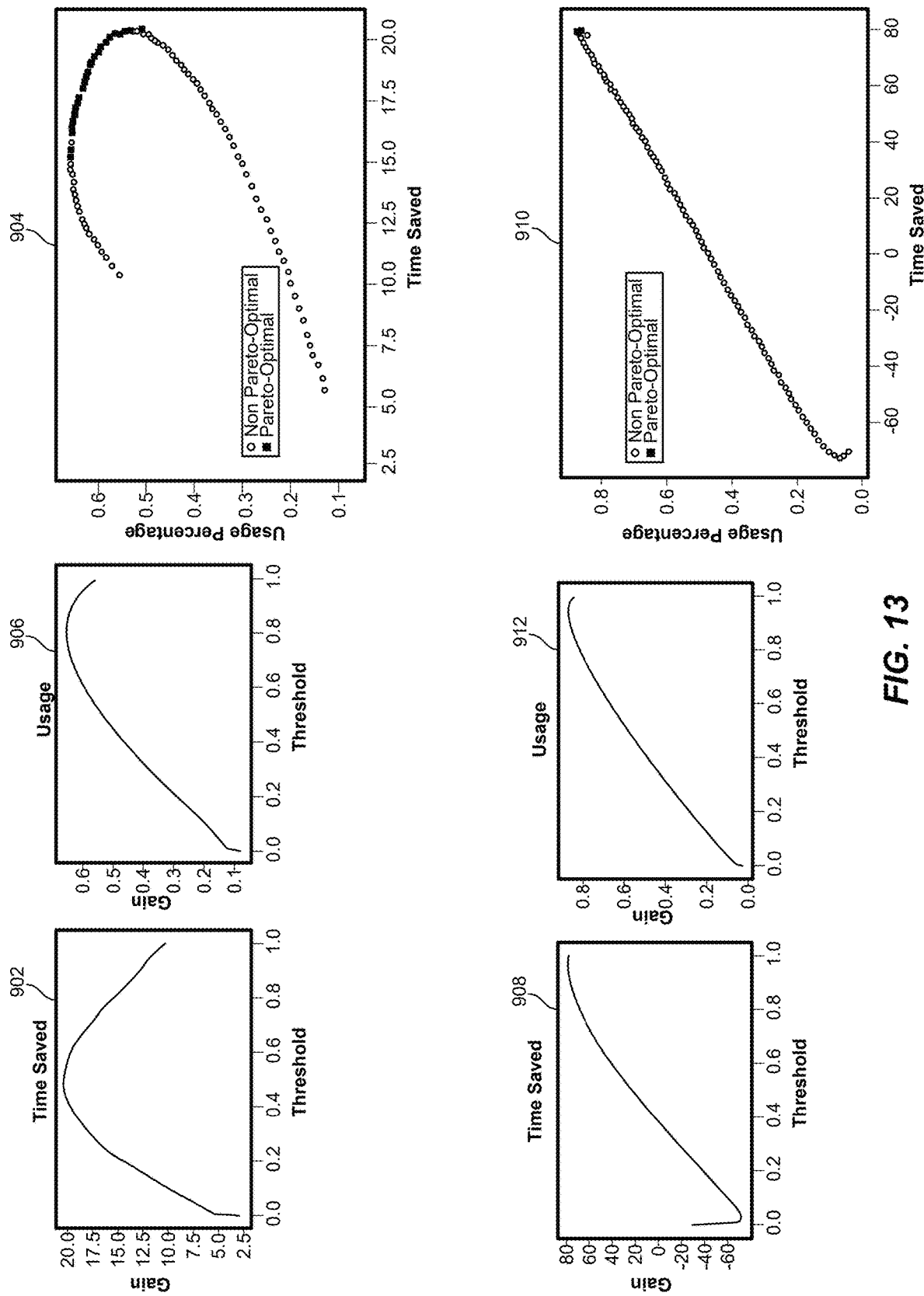
FIG. 13 illustrates optimizing both the time saved for users and the suggestion usage percentage with the Pareto front.

FIG. 13 illustrates optimizing both the time saved for users and the suggestion usage percentage with the Pareto front. In some examples, the systems and methods described herein may optimize for more than one objective function. For example, these systems and methods may optimize a time-saving objective and a suggestion-usage-rate objective at once. A point in the graphs of FIG. 13 is considered Pareto optimal if one dimension (objective) cannot be improved without other dimensions (objectives) worsening. Graphs 902 and 906 show relationships between gain and confidence threshold in a pointing task for the time-saved objective and the suggestion-usage-rate objective, respectively. Graphs 908 and 912 show relationships between gain and confidence threshold in a text matching task for the time-saved objective and the suggestion-usage-rate objective, respectively. Graph 904 shows non-Pareto optimal and Pareto-optimal solutions for graphs 902 and 906. Graph 910 shows non-Pareto optimal and Pareto-optimal solutions for graphs 908 and 912. In some examples, systems and methods described herein may identify sets of Pareto-optimal solutions across multiple objective functions, and select a timing for intelligent facilitation based on the range of Pareto-optimal solutions.

Figure 14:
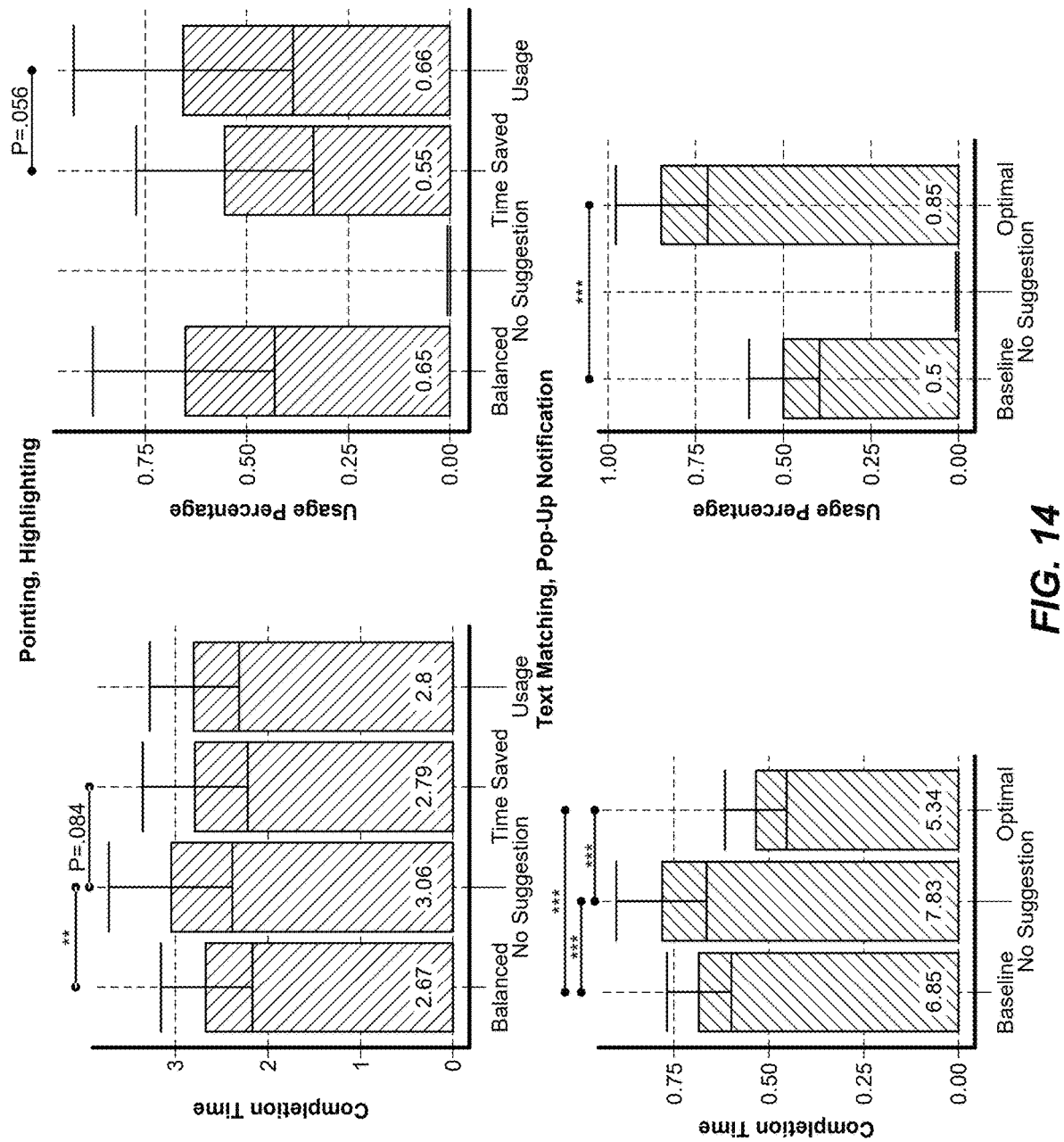
FIG. 14 illustrates averaged results of task completion time and suggestion usage percentage.

FIG. 14 illustrates averaged results of task completion time and suggestion usage percentage. A pointing task (with a highlighting suggestion method) is shown with four conditions: balanced optimization, no suggestion, time saved optimization, and usage percentage optimization. A text matching task (with a pop-up suggestion method) is shown with three conditions: heuristic thresholding baseline, no suggestion, and optimal thresholding as described herein. Error bars depicted represent mean±std. As can be seen in FIG. 14, the systems and methods described herein may effectively optimize timing for intelligent facilitation for one or more different objectives.

Embodiments of the present disclosure may include or be implemented in conjunction with various types of artificial-reality systems. Artificial reality may be a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 1500 in FIG. 15) or that visually immerses a user in an artificial reality (such as, e.g., virtual-reality system 1600 in FIG. 16). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 15:
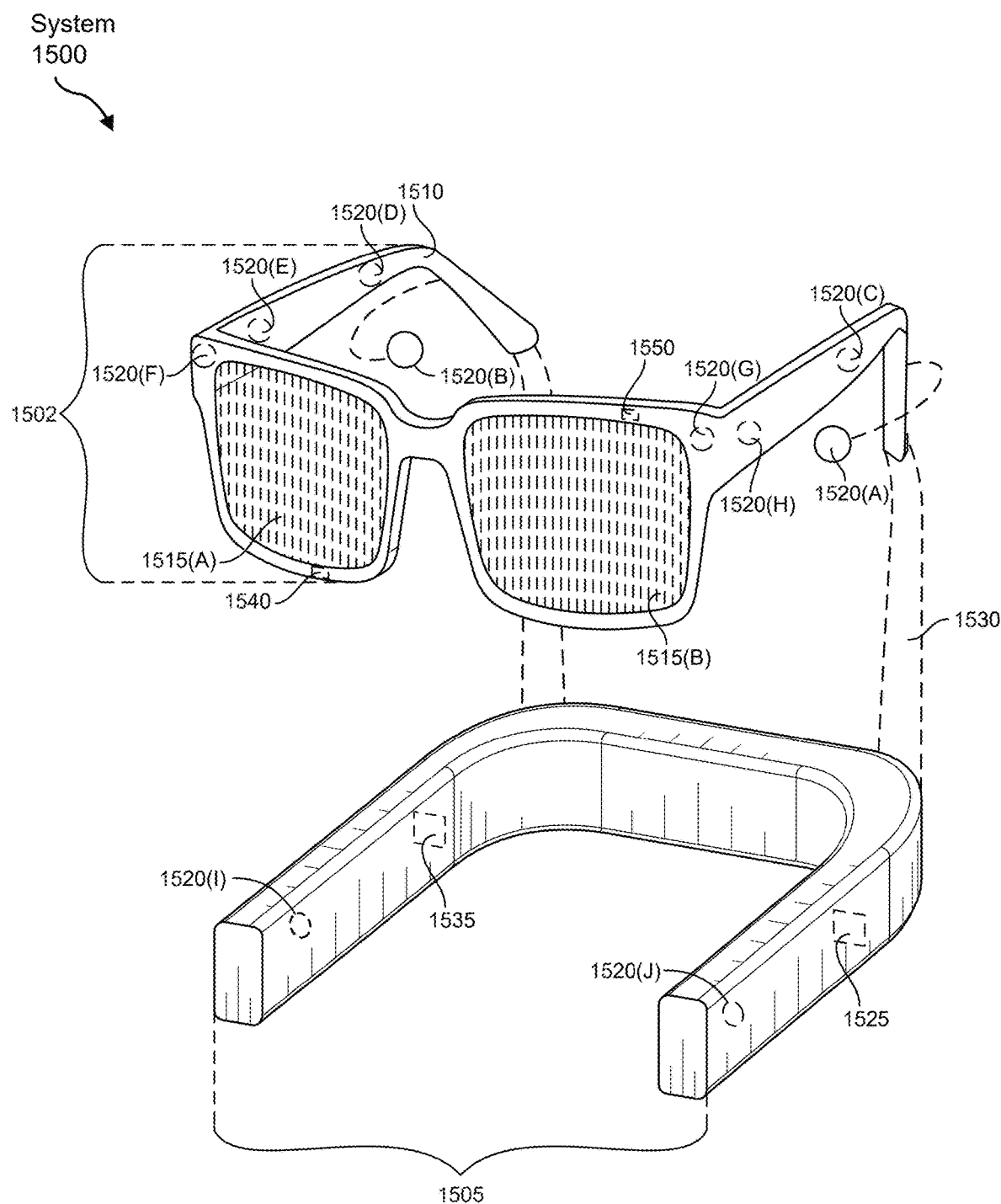
FIG. 15 is an illustration of exemplary augmented-reality glasses that may be used in connection with embodiments of this disclosure.

Turning to FIG. 15, augmented-reality system 1500 may include an eyewear device 1502 with a frame 1510 configured to hold a left display device 1515(A) and a right display device 1515(B) in front of a user's eyes. Display devices 1515(A) and 1515(B) may act together or independently to present an image or series of images to a user. While augmented-reality system 1500 includes two displays, embodiments of this disclosure may be implemented in augmented-reality systems with a single NED or more than two NEDs.

In some embodiments, augmented-reality system 1500 may include one or more sensors, such as sensor 1540. Sensor 1540 may generate measurement signals in response to motion of augmented-reality system 1500 and may be located on substantially any portion of frame 1510. Sensor 1540 may represent one or more of a variety of different sensing mechanisms, such as a position sensor, an inertial measurement unit (IMU), a depth camera assembly, a structured light emitter and/or detector, or any combination thereof. In some embodiments, augmented-reality system 1500 may or may not include sensor 1540 or may include more than one sensor. In embodiments in which sensor 1540 includes an IMU, the IMU may generate calibration data based on measurement signals from sensor 1540. Examples of sensor 1540 may include, without limitation, accelerometers, gyroscopes, magnetometers, other suitable types of sensors that detect motion, sensors used for error correction of the IMU, or some combination thereof.

In some examples, augmented-reality system 1500 may also include a microphone array with a plurality of acoustic transducers 1520(A)-1520(J), referred to collectively as acoustic transducers 1520. Acoustic transducers 1520 may represent transducers that detect air pressure variations induced by sound waves. Each acoustic transducer 1520 may be configured to detect sound and convert the detected sound into an electronic format (e.g., an analog or digital format). The microphone array in FIG. 15 may include, for example, ten acoustic transducers: 1520(A) and 1520(B), which may be designed to be placed inside a corresponding ear of the user, acoustic transducers 1520(C), 1520(D), 1520(E), 1520(F), 1520(G), and 1520(H), which may be positioned at various locations on frame 1510, and/or acoustic transducers 1520(I) and 1520(J), which may be positioned on a corresponding neckband 1505.

In some embodiments, one or more of acoustic transducers 1520(A)-(J) may be used as output transducers (e.g., speakers). For example, acoustic transducers 1520(A) and/or 1520(B) may be earbuds or any other suitable type of headphone or speaker.

The configuration of acoustic transducers 1520 of the microphone array may vary. While augmented-reality system 1500 is shown in FIG. 15 as having ten acoustic transducers 1520, the number of acoustic transducers 1520 may be greater or less than ten. In some embodiments, using higher numbers of acoustic transducers 1520 may increase the amount of audio information collected and/or the sensitivity and accuracy of the audio information. In contrast, using a lower number of acoustic transducers 1520 may decrease the computing power required by an associated controller 1550 to process the collected audio information. In addition, the position of each acoustic transducer 1520 of the microphone array may vary. For example, the position of an acoustic transducer 1520 may include a defined position on the user, a defined coordinate on frame 1510, an orientation associated with each acoustic transducer 1520, or some combination thereof.

Acoustic transducers 1520(A) and 1520(B) may be positioned on different parts of the user's ear, such as behind the pinna, behind the tragus, and/or within the auricle or fossa. Or, there may be additional acoustic transducers 1520 on or surrounding the ear in addition to acoustic transducers 1520 inside the ear canal. Having an acoustic transducer 1520 positioned next to an ear canal of a user may enable the microphone array to collect information on how sounds arrive at the ear canal. By positioning at least two of acoustic transducers 1520 on either side of a user's head (e.g., as binaural microphones), augmented-reality device 1500 may simulate binaural hearing and capture a 3D stereo sound field around about a user's head. In some embodiments, acoustic transducers 1520(A) and 1520(B) may be connected to augmented-reality system 1500 via a wired connection 1530, and in other embodiments acoustic transducers 1520(A) and 1520(B) may be connected to augmented-reality system 1500 via a wireless connection (e.g., a BLUETOOTH connection). In still other embodiments, acoustic transducers 1520(A) and 1520(B) may not be used at all in conjunction with augmented-reality system 1500.

Acoustic transducers 1520 on frame 1510 may be positioned in a variety of different ways, including along the length of the temples, across the bridge, above or below display devices 1515(A) and 1515(B), or some combination thereof. Acoustic transducers 1520 may also be oriented such that the microphone array is able to detect sounds in a wide range of directions surrounding the user wearing the augmented-reality system 1500. In some embodiments, an optimization process may be performed during manufacturing of augmented-reality system 1500 to determine relative positioning of each acoustic transducer 1520 in the microphone array.

In some examples, augmented-reality system 1500 may include or be connected to an external device (e.g., a paired device), such as neckband 1505. Neckband 1505 generally represents any type or form of paired device. Thus, the following discussion of neckband 1505 may also apply to various other paired devices, such as charging cases, smart watches, smart phones, wrist bands, other wearable devices, hand-held controllers, tablet computers, laptop computers, other external compute devices, etc.

As shown, neckband 1505 may be coupled to eyewear device 1502 via one or more connectors. The connectors may be wired or wireless and may include electrical and/or non-electrical (e.g., structural) components. In some cases, eyewear device 1502 and neckband 1505 may operate independently without any wired or wireless connection between them. While FIG. 15 illustrates the components of eyewear device 1502 and neckband 1505 in example locations on eyewear device 1502 and neckband 1505, the components may be located elsewhere and/or distributed differently on eyewear device 1502 and/or neckband 1505. In some embodiments, the components of eyewear device 1502 and neckband 1505 may be located on one or more additional peripheral devices paired with eyewear device 1502, neckband 1505, or some combination thereof.

Pairing external devices, such as neckband 1505, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1500 may be provided by a paired device or shared between a paired device and an eyewear device, thus reducing the weight, heat profile, and form factor of the eyewear device overall while still retaining desired functionality. For example, neckband 1505 may allow components that would otherwise be included on an eyewear device to be included in neckband 1505 since users may tolerate a heavier weight load on shoulders than they would tolerate on heads. Neckband 1505 may also have a larger surface area over which to diffuse and disperse heat to the ambient environment. Thus, neckband 1505 may allow for greater battery and computation capacity than might otherwise have been possible on a stand-alone eyewear device. Since weight carried in neckband 1505 may be less invasive to a user than weight carried in eyewear device 1502, a user may tolerate wearing a lighter eyewear device and carrying or wearing the paired device for greater lengths of time than a user would tolerate wearing a heavy standalone eyewear device, thereby enabling users to more fully incorporate artificial-reality environments into day-to-day activities.

Neckband 1505 may be communicatively coupled with eyewear device 1502 and/or to other devices. These other devices may provide certain functions (e.g., tracking, localizing, depth mapping, processing, storage, etc.) to augmented-reality system 1500. In the embodiment of FIG. 15, neckband 1505 may include two acoustic transducers (e.g., 1520(I) and 1520(J)) that are part of the microphone array (or potentially form own microphone subarray). Neckband 1505 may also include a controller 1525 and a power source 1535.

Acoustic transducers 1520(I) and 1520(J) of neckband 1505 may be configured to detect sound and convert the detected sound into an electronic format (analog or digital). In the embodiment of FIG. 15, acoustic transducers 1520(I) and 1520(J) may be positioned on neckband 1505, thereby increasing the distance between the neckband acoustic transducers 1520(I) and 1520(J) and other acoustic transducers 1520 positioned on eyewear device 1502. In some cases, increasing the distance between acoustic transducers 1520 of the microphone array may improve the accuracy of beamforming performed via the microphone array. For example, if a sound is detected by acoustic transducers 1520(C) and 1520(D) and the distance between acoustic transducers 1520(C) and 1520(D) is greater than, e.g., the distance between acoustic transducers 1520(D) and 1520(E), the determined source location of the detected sound may be more accurate than if the sound had been detected by acoustic transducers 1520(D) and 1520(E).

Controller 1525 of neckband 1505 may process information generated by the sensors on neckband 1505 and/or augmented-reality system 1500. For example, controller 1525 may process information from the microphone array that describes sounds detected by the microphone array. For each detected sound, controller 1525 may perform a direction-of-arrival (DOA) estimation to estimate a direction from which the detected sound arrived at the microphone array. As the microphone array detects sounds, controller 1525 may populate an audio data set with the information. In embodiments in which augmented-reality system 1500 includes an inertial measurement unit, controller 1525 may compute all inertial and spatial calculations from the IMU located on eyewear device 1502. A connector may convey information between augmented-reality system 1500 and neckband 1505 and between augmented-reality system 1500 and controller 1525. The information may be in the form of optical data, electrical data, wireless data, or any other transmittable data form. Moving the processing of information generated by augmented-reality system 1500 to neckband 1505 may reduce weight and heat in eyewear device 1502, making it more comfortable to the user.

Power source 1535 in neckband 1505 may provide power to eyewear device 1502 and/or to neckband 1505. Power source 1535 may include, without limitation, lithium-ion batteries, lithium-polymer batteries, primary lithium batteries, alkaline batteries, or any other form of power storage. In some cases, power source 1535 may be a wired power source. Including power source 1535 on neckband 1505 instead of on eyewear device 1502 may help better distribute the weight and heat generated by power source 1535.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1600 in FIG. 16, that mostly or completely covers a user's field of view. Virtual-reality system 1600 may include a front rigid body 1602 and a band 1604 shaped to fit around a user's head. Virtual-reality system 1600 may also include output audio transducers 1606(A) and 1606(B). Furthermore, while not shown in FIG. 16, front rigid body 1602 may include one or more electronic elements, including one or more electronic displays, one or more inertial measurement units (IMUs), one or more tracking emitters or detectors, and/or any other suitable device or system for creating an artificial-reality experience.

Artificial-reality systems may include a variety of types of visual feedback mechanisms. For example, display devices in augmented-reality system 1500 and/or virtual-reality system 1600 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 1500 and/or virtual-reality system 1600 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 1500 and/or virtual-reality system 1600 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

Some augmented-reality systems may map a user's and/or device's environment using techniques referred to as "simultaneous location and mapping" (SLAM). SLAM mapping and location identifying techniques may involve a variety of hardware and software tools that may create or update a map of an environment while simultaneously keeping track of a user's location within the mapped environment. SLAM may use many different types of sensors to create a map and determine a user's position within the map.

SLAM techniques may, for example, implement optical sensors to determine a user's location. Radios including WiFi, BLUETOOTH, global positioning system (GPS), cellular or other communication devices may be also used to determine a user's location relative to a radio transceiver or group of transceivers (e.g., a WiFi router or group of GPS satellites). Acoustic sensors such as microphone arrays or 2D or 3D sonar sensors may also be used to determine a user's location within an environment. Augmented-reality and virtual-reality devices (such as systems 1500 and 1600 of FIGS. 15 and 16, respectively) may incorporate any or all of these types of sensors to perform SLAM operations such as creating and continually updating maps of the user's current environment. In at least some of the embodiments described herein, SLAM data generated by these sensors may be referred to as "environmental data" and may indicate a user's current environment. This data may be stored in a local or remote data store (e.g., a cloud data store) and may be provided to a user's AR/VR device on demand.

When the user is wearing an augmented-reality headset or virtual-reality headset in a given environment, the user may be interacting with other users or other electronic devices that serve as audio sources. In some cases, it may be desirable to determine where the audio sources are located relative to the user and then present the audio sources to the user as if they were coming from the location of the audio source. The process of determining where the audio sources are located relative to the user may be referred to as "localization," and the process of rendering playback of the audio source signal to appear as if it is coming from a specific direction may be referred to as "spatialization."

Localizing an audio source may be performed in a variety of different ways. In some cases, an augmented-reality or virtual-reality headset may initiate a DOA analysis to determine the location of a sound source. The DOA analysis may include analyzing the intensity, spectra, and/or arrival time of each sound at the artificial-reality device to determine the direction from which the sounds originated. The DOA analysis may include any suitable algorithm for analyzing the surrounding acoustic environment in which the artificial-reality device is located.

For example, the DOA analysis may be designed to receive input signals from a microphone and apply digital signal processing algorithms to the input signals to estimate the direction of arrival. These algorithms may include, for example, delay and sum algorithms where the input signal is sampled, and the resulting weighted and delayed versions of the sampled signal are averaged together to determine a direction of arrival. A least mean squared (LMS) algorithm may also be implemented to create an adaptive filter. This adaptive filter may then be used to identify differences in signal intensity, for example, or differences in time of arrival. These differences may then be used to estimate the direction of arrival. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct-path audio signal. Those bins having a portion of the direct-path signal may then be analyzed to identify the angle at which a microphone array received the direct-path audio signal. The determined angle may then be used to identify the direction of arrival for the received input signal. Other algorithms not listed above may also be used alone or in combination with the above algorithms to determine DOA.

In some embodiments, different users may perceive the source of a sound as coming from slightly different locations. This may be the result of each user having a unique head-related transfer function (HRTF), which may be dictated by a user's anatomy including ear canal length and the positioning of the ear drum. The artificial-reality device may provide an alignment and orientation guide, which the user may follow to customize the sound signal presented to the user based on unique HRTF. In some embodiments, an artificial-reality device may implement one or more microphones to listen to sounds within the user's environment. The augmented-reality or virtual-reality headset may use a variety of different array transfer functions (e.g., any of the DOA algorithms identified above) to estimate the direction of arrival for the sounds. Once the direction of arrival has been determined, the artificial-reality device may play back sounds to the user according to the user's unique HRTF. Accordingly, the DOA estimation generated using the array transfer function (ATF) may be used to determine the direction from which the sounds are to be played from. The playback sounds may be further refined based on how that specific user hears sounds according to the HRTF.

In addition to or as an alternative to performing a DOA estimation, an artificial-reality device may perform localization based on information received from other types of sensors. These sensors may include cameras, IR sensors, heat sensors, motion sensors, GPS receivers, or in some cases, sensors that detect a user's eye movements. For example, as noted above, an artificial-reality device may include an eye tracker or gaze detector that determines where the user is looking. Often, the user's eyes will look at the source of the sound, if only briefly. Such clues provided by the user's eyes may further aid in determining the location of a sound source. Other sensors such as cameras, heat sensors, and IR sensors may also indicate the location of a user, the location of an electronic device, or the location of another sound source. Any or all of the above methods may be used individually or in combination to determine the location of a sound source and may further be used to update the location of a sound source over time.

Some embodiments may implement the determined DOA to generate a more customized output audio signal for the user. For instance, an "acoustic transfer function" may characterize or define how a sound is received from a given location. More specifically, an acoustic transfer function may define the relationship between parameters of a sound at its source location and the parameters by which the sound signal is detected (e.g., detected by a microphone array or detected by a user's ear). An artificial-reality device may include one or more acoustic sensors that detect sounds within range of the device. A controller of the artificial-reality device may estimate a DOA for the detected sounds (using, e.g., any of the methods identified above) and, based on the parameters of the detected sounds, may generate an acoustic transfer function that is specific to the location of the device. This customized acoustic transfer function may thus be used to generate a spatialized output audio signal where the sound is perceived as coming from a specific location.

Indeed, once the location of the sound source or sources is known, the artificial-reality device may re-render (i.e., spatialize) the sound signals to sound as if coming from the direction of that sound source. The artificial-reality device may apply filters or other digital signal processing that alter the intensity, spectra, or arrival time of the sound signal. The digital signal processing may be applied in such a way that the sound signal is perceived as originating from the determined location. The artificial-reality device may amplify or subdue certain frequencies or change the time that the signal arrives at each ear. In some cases, the artificial-reality device may create an acoustic transfer function that is specific to the location of the device and the detected direction of arrival of the sound signal. In some embodiments, the artificial-reality device may re-render the source signal in a stereo device or multi-speaker device (e.g., a surround sound device). In such cases, separate and distinct audio signals may be sent to each speaker. Each of these audio signals may be altered according to the user's HRTF and according to measurements of the user's location and the location of the sound source to sound as if they are coming from the determined location of the sound source. Accordingly, in this manner, the artificial-reality device (or speakers associated with the device) may re-render an audio signal to sound as if originating from a specific location.

As noted, artificial-reality systems 1500 and 1600 may be used with a variety of other types of devices to provide a more compelling artificial-reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 17:
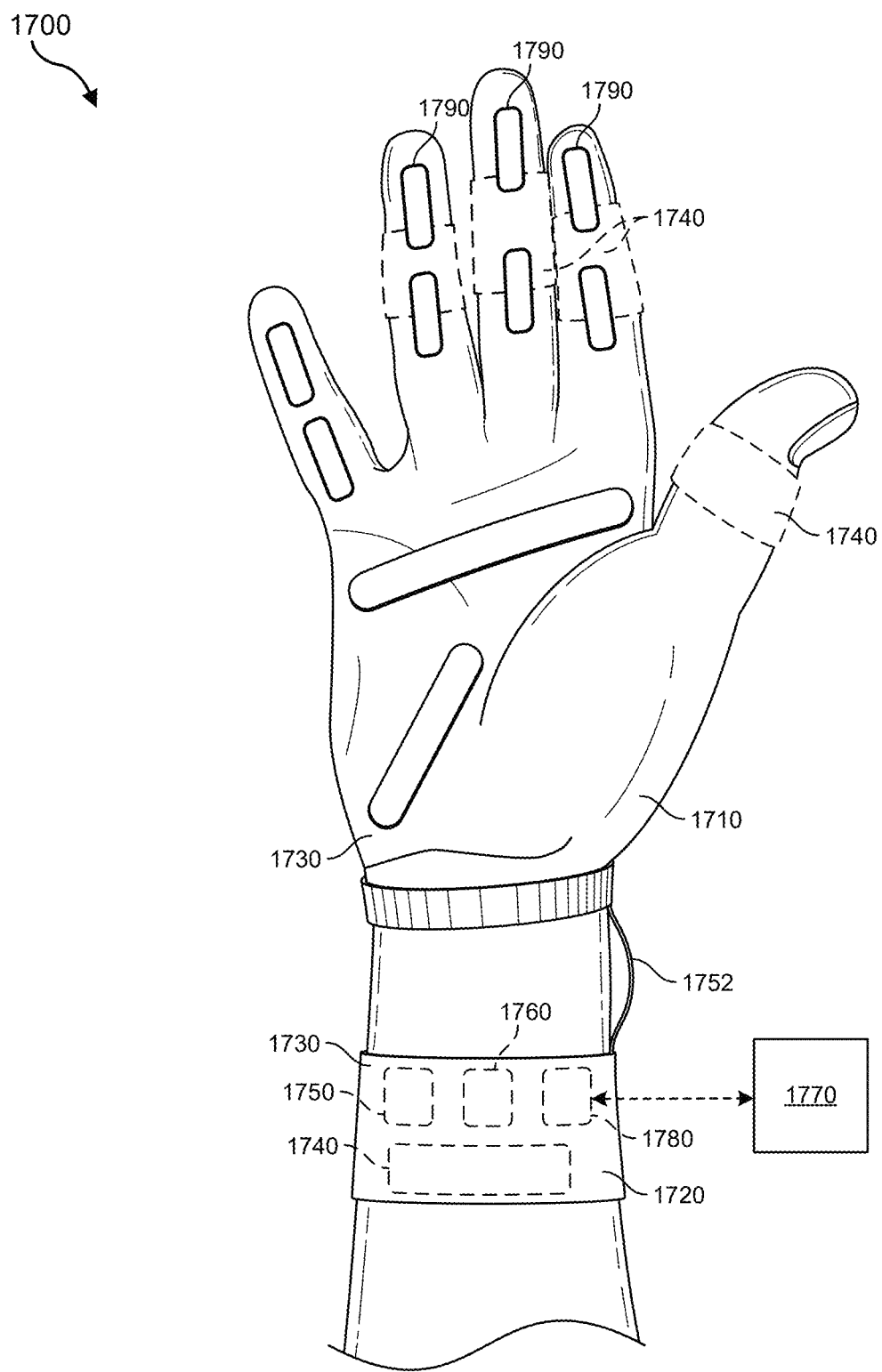
FIG. 17 is an illustration of exemplary haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 17 illustrates a vibrotactile system 1700 in the form of a wearable glove (haptic device 1710) and wristband (haptic device 1720). Haptic device 1710 and haptic device 1720 are shown as examples of wearable devices that include a flexible, wearable textile material 1730 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, nonwoven fabric, leather, cloth, a flexible polymer material, composite materials, etc.

One or more vibrotactile devices 1740 may be positioned at least partially within one or more corresponding pockets formed in textile material 1730 of vibrotactile system 1700. Vibrotactile devices 1740 may be positioned in locations to provide a vibrating sensation (e.g., haptic feedback) to a user of vibrotactile system 1700. For example, vibrotactile devices 1740 may be positioned against the user's finger(s), thumb, or wrist, as shown in FIG. 17. Vibrotactile devices 1740 may, in some examples, be sufficiently flexible to conform to or bend with the user's corresponding body part(s).

A power source 1750 (e.g., a battery) for applying a voltage to the vibrotactile devices 1740 for activation thereof may be electrically coupled to vibrotactile devices 1740, such as via conductive wiring 1752. In some examples, each of vibrotactile devices 1740 may be independently electrically coupled to power source 1750 for individual activation. In some embodiments, a processor 1760 may be operatively coupled to power source 1750 and configured (e.g., programmed) to control activation of vibrotactile devices 1740.

Vibrotactile system 1700 may be implemented in a variety of ways. In some examples, vibrotactile system 1700 may be a standalone system with integral subsystems and components for operation independent of other devices and systems. As another example, vibrotactile system 1700 may be configured for interaction with another device or system 1770. For example, vibrotactile system 1700 may, in some examples, include a communications interface 1780 for receiving and/or sending signals to the other device or system 1770. The other device or system 1770 may be a mobile device, a gaming console, an artificial-reality (e.g., virtual-reality, augmented-reality, mixed-reality) device, a personal computer, a tablet computer, a network device (e.g., a modem, a router, etc.), a handheld controller, etc. Communications interface 1780 may enable communications between vibrotactile system 1700 and the other device or system 1770 via a wireless (e.g., Wi-Fi, BLUETOOTH, cellular, radio, etc.) link or a wired link. If present, communications interface 1780 may be in communication with processor 1760, such as to provide a signal to processor 1760 to activate or deactivate one or more of the vibrotactile devices 1740.

Vibrotactile system 1700 may optionally include other subsystems and components, such as touch-sensitive pads 1790, pressure sensors, motion sensors, position sensors, lighting elements, and/or user interface elements (e.g., an on/off button, a vibration control element, etc.). During use, vibrotactile devices 1740 may be configured to be activated for a variety of different reasons, such as in response to the user's interaction with user interface elements, a signal from the motion or position sensors, a signal from the touch-sensitive pads 1790, a signal from the pressure sensors, a signal from the other device or system 1770, etc.

Although power source 1750, processor 1760, and communications interface 1780 are illustrated in FIG. 17 as being positioned in haptic device 1720, the present disclosure is not so limited. For example, one or more of power source 1750, processor 1760, or communications interface 1780 may be positioned within haptic device 1710 or within another wearable textile.

Figure 18:
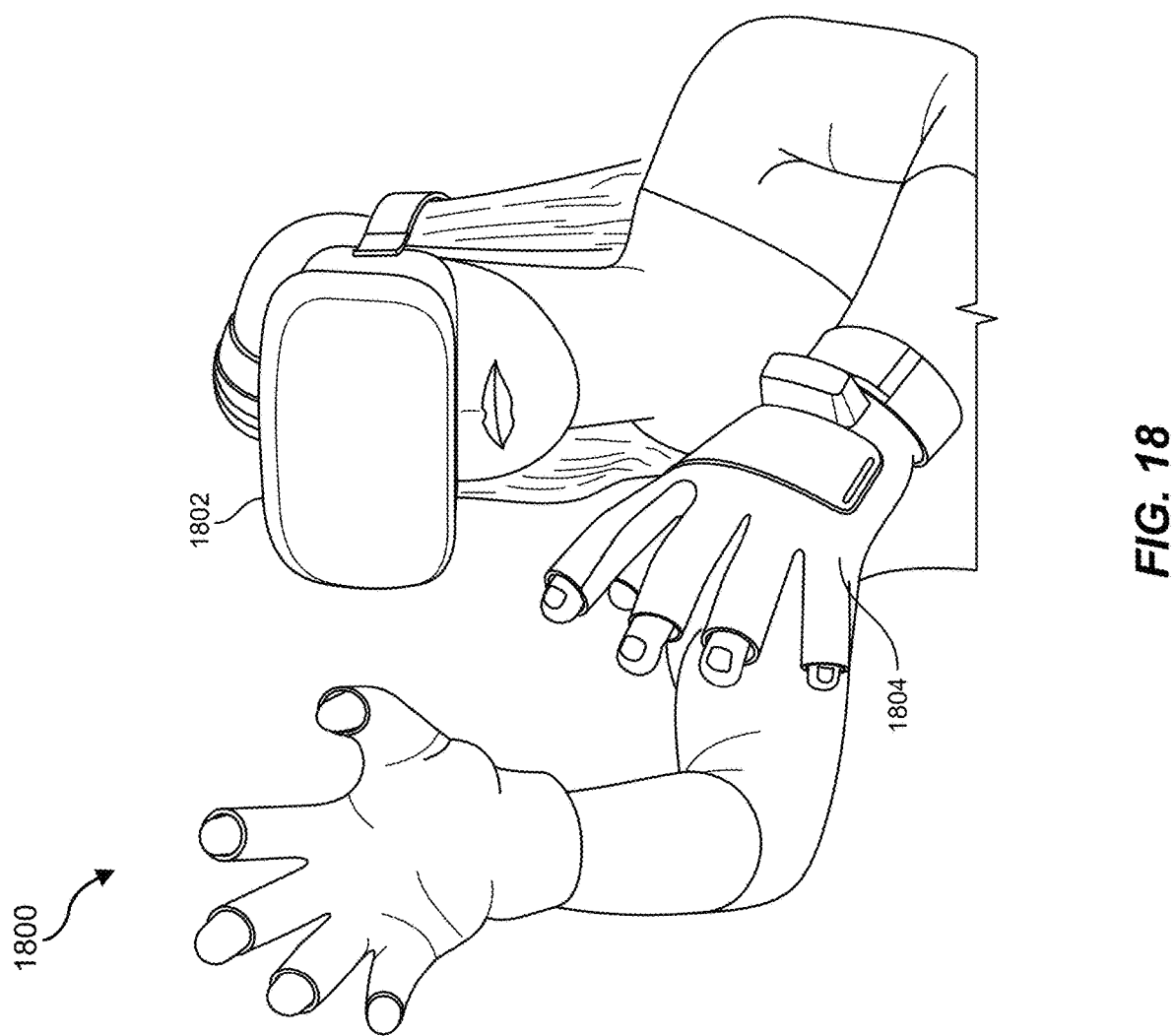
FIG. 18 is an illustration of an exemplary virtual-reality environment according to embodiments of this disclosure.

Haptic wearables, such as those shown in and described in connection with FIG. 17, may be implemented in a variety of types of artificial-reality systems and environments. FIG. 18 shows an example artificial-reality environment 1800 including one head-mounted virtual-reality display and two haptic devices (i.e., gloves), and in other embodiments any number and/or combination of these components and other components may be included in an artificial-reality system. For example, in some embodiments there may be multiple head-mounted displays each having an associated haptic device, with each head-mounted display and each haptic device communicating with the same console, portable computing device, or other computing system.

Figure 16:
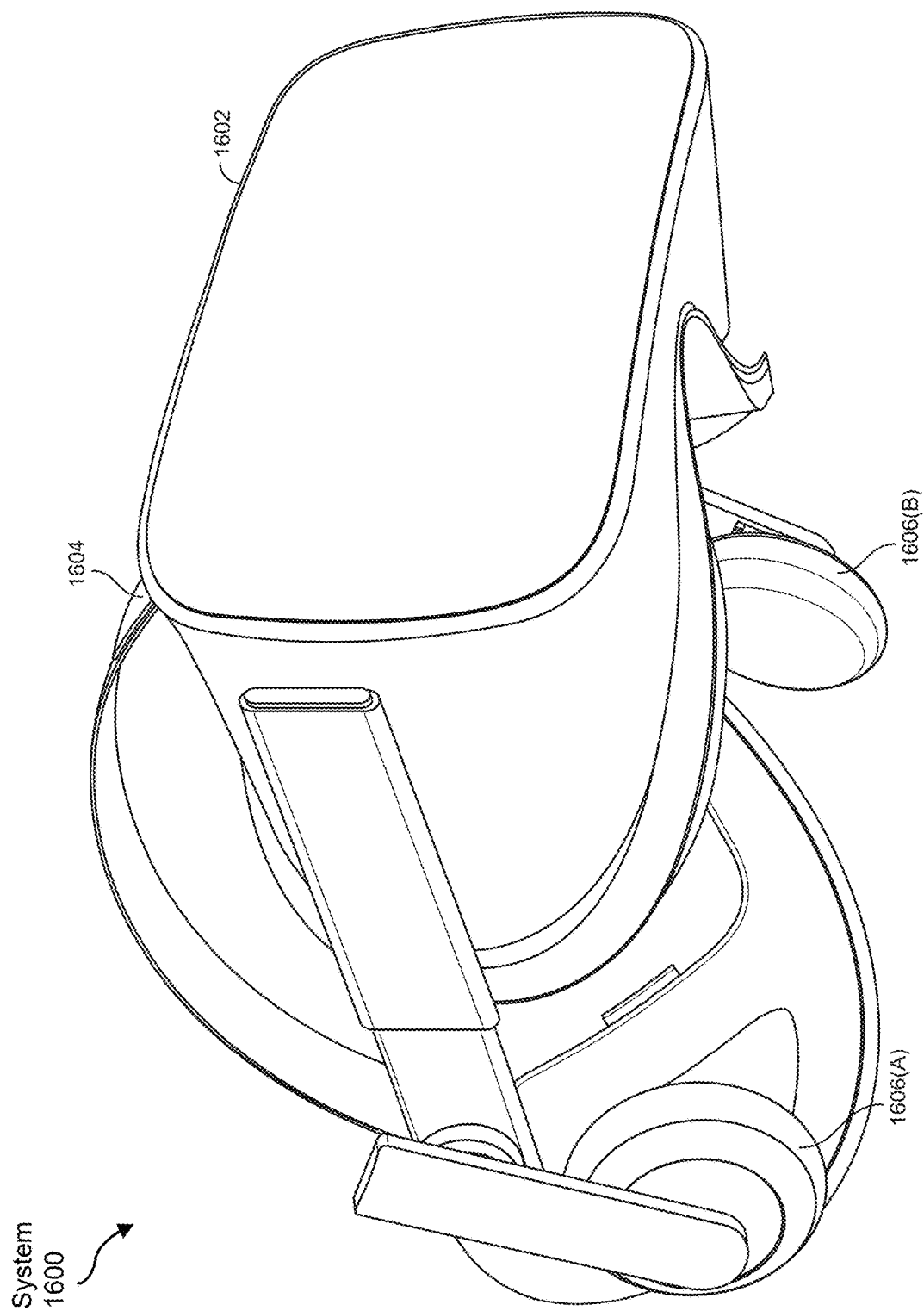
FIG. 16 is an illustration of an exemplary virtual-reality headset that may be used in connection with embodiments of this disclosure.

Head-mounted display 1802 generally represents any type or form of virtual-reality system, such as virtual-reality system 1600 in FIG. 16. Haptic device 1804 generally represents any type or form of wearable device, worn by a user of an artificial-reality system, that provides haptic feedback to the user to give the user the perception that he or she is physically engaging with a virtual object. In some embodiments, haptic device 1804 may provide haptic feedback by applying vibration, motion, and/or force to the user. For example, haptic device 1804 may limit or augment a user's movement. To give a specific example, haptic device 1804 may limit a user's hand from moving forward so that the user has the perception that his or her hand has come in physical contact with a virtual wall. In this specific example, one or more actuators within the haptic device may achieve the physical-movement restriction by pumping fluid into an inflatable bladder of the haptic device. In some examples, a user may also use haptic device 1804 to send action requests to a console. Examples of action requests include, without limitation, requests to start an application and/or end the application and/or requests to perform a particular action within the application.

Figure 19:
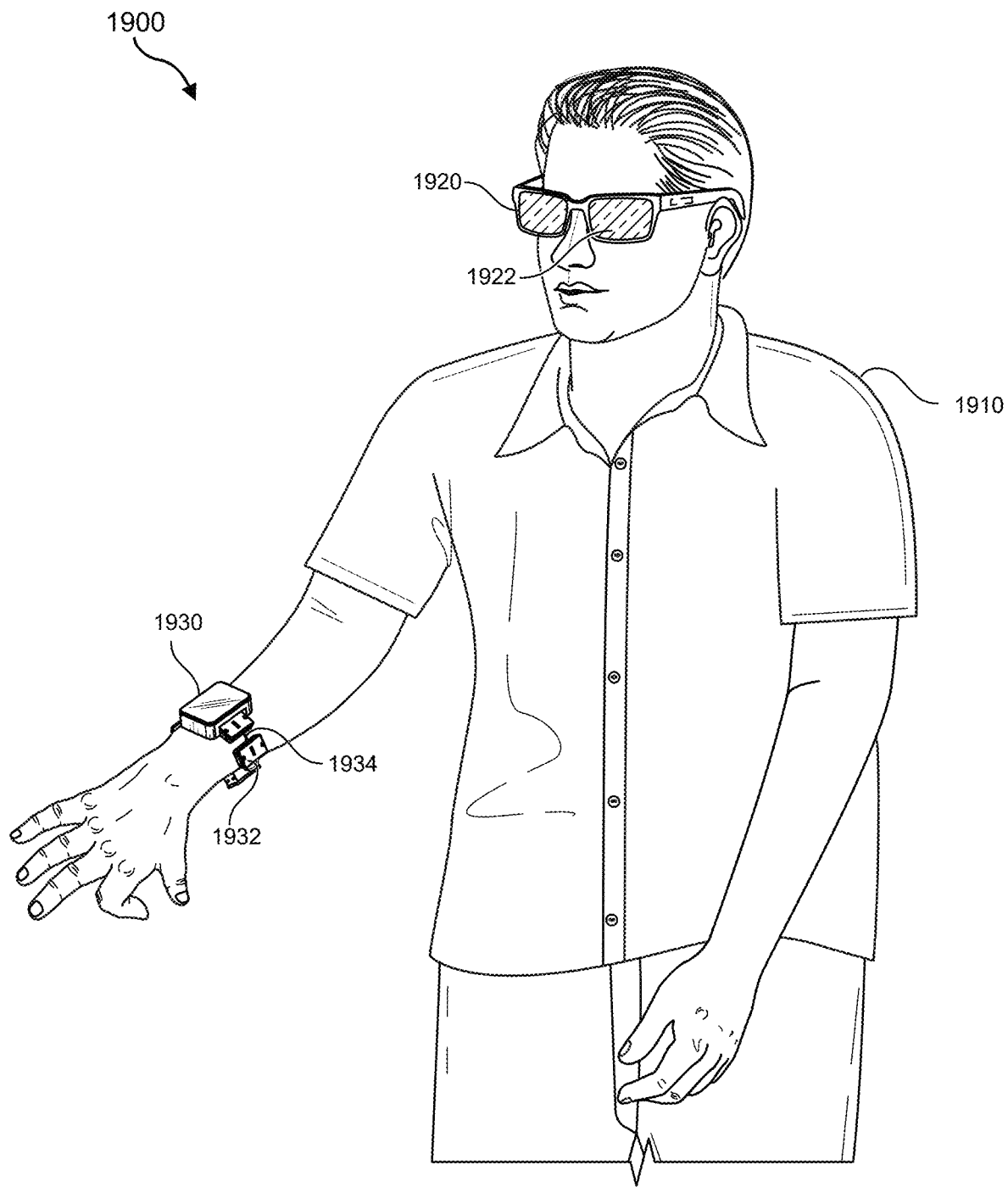
FIG. 19 is an illustration of an exemplary augmented-reality environment according to embodiments of this disclosure.

While haptic interfaces may be used with virtual-reality systems, as shown in FIG. 18, haptic interfaces may also be used with augmented-reality systems, as shown in FIG. 19. FIG. 19 is a perspective view of a user 1910 interacting with an augmented-reality system 1900. In this example, user 1910 may wear a pair of augmented-reality glasses 1920 that may have one or more displays 1922 and that are paired with a haptic device 1930. In this example, haptic device 1930 may be a wristband that includes a plurality of band elements 1932 and a tensioning mechanism 1934 that connects band elements 1932 to one another.

One or more of band elements 1932 may include any type or form of actuator suitable for providing haptic feedback. For example, one or more of band elements 1932 may be configured to provide one or more of various types of cutaneous feedback, including vibration, force, traction, texture, and/or temperature. To provide such feedback, band elements 1932 may include one or more of various types of actuators. In one example, each of band elements 1932 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 1710, 1720, 1804, and 1930 may include any suitable number and/or type of haptic transducer, sensor, and/or feedback mechanism. For example, haptic devices 1710, 1720, 1804, and 1930 may include one or more mechanical transducers, piezoelectric transducers, and/or fluidic transducers. Haptic devices 1710, 1720, 1804, and 1930 may also include various combinations of different types and forms of transducers that work together or independently to enhance a user's artificial-reality experience. In one example, each of band elements 1932 of haptic device 1930 may include a vibrotactor (e.g., a vibrotactile actuator) configured to vibrate in unison or independently to provide one or more of various types of haptic sensations to a user.

In some embodiments, the systems described herein may also include an eye-tracking subsystem designed to identify and track various characteristics of a user's eye(s), such as the user's gaze direction. The phrase "eye tracking" may, in some examples, refer to a process by which the position, orientation, and/or motion of an eye is measured, detected, sensed, determined, and/or monitored. The disclosed systems may measure the position, orientation, and/or motion of an eye in a variety of different ways, including through the use of various optical-based eye-tracking techniques, ultrasound-based eye-tracking techniques, etc. An eye-tracking subsystem may be configured in a number of different ways and may include a variety of different eye-tracking hardware components or other computer-vision components. For example, an eye-tracking subsystem may include a variety of different optical sensors, such as two-dimensional (2D) or 3D cameras, time-of-flight depth sensors, single-beam or sweeping laser rangefinders, 3D LiDAR sensors, and/or any other suitable type or form of optical sensor. In this example, a processing subsystem may process data from one or more of these sensors to measure, detect, determine, and/or otherwise monitor the position, orientation, and/or motion of the user's eye(s).

Figure 20:
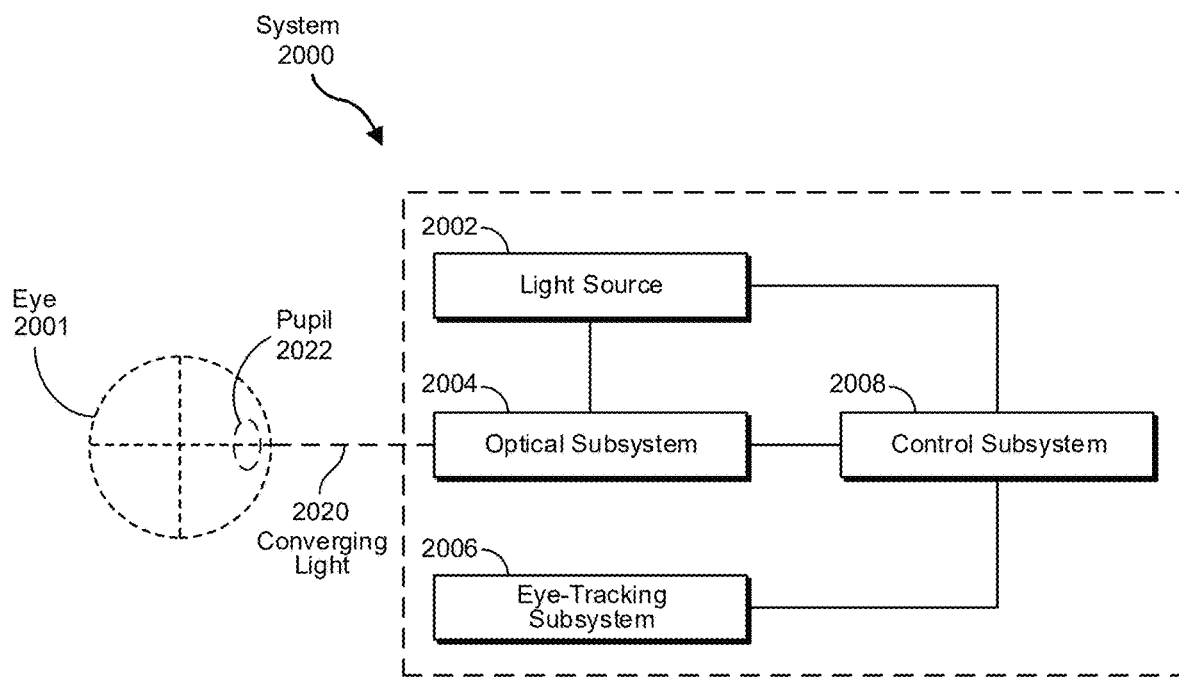
FIG. 20 an illustration of an exemplary system that incorporates an eye-tracking subsystem capable of tracking a user's eye(s).

FIG. 20 is an illustration of an exemplary system 2000 that incorporates an eye-tracking subsystem capable of tracking a user's eye(s). As depicted in FIG. 20, system 2000 may include a light source 2002, an optical subsystem 2004, an eye-tracking subsystem 2006, and/or a control subsystem 2008. In some examples, light source 2002 may generate light for an image (e.g., to be presented to an eye 2001 of the viewer). Light source 2002 may represent any of a variety of suitable devices. For example, light source 2002 may include a two-dimensional projector (e.g., a LCoS display), a scanning source (e.g., a scanning laser), or other device (e.g., an LCD, an LED display, an OLED display, an active-matrix OLED display (AMOLED), a transparent OLED display (TOLED), a waveguide, or some other display capable of generating light for presenting an image to the viewer). In some examples, the image may represent a virtual image, which may refer to an optical image formed from the apparent divergence of light rays from a point in space, as opposed to an image formed from the light ray's actual divergence.

In some embodiments, optical subsystem 2004 may receive the light generated by light source 2002 and generate, based on the received light, converging light 2020 that includes the image. In some examples, optical subsystem 2004 may include any number of lenses (e.g., Fresnel lenses, convex lenses, concave lenses), apertures, filters, mirrors, prisms, and/or other optical components, possibly in combination with actuators and/or other devices. In particular, the actuators and/or other devices may translate and/or rotate one or more of the optical components to alter one or more aspects of converging light 2020. Further, various mechanical couplings may serve to maintain the relative spacing and/or the orientation of the optical components in any suitable combination.

In one embodiment, eye-tracking subsystem 2006 may generate tracking information indicating a gaze angle of an eye 2001 of the viewer. In this embodiment, control subsystem 2008 may control aspects of optical subsystem 2004 (e.g., the angle of incidence of converging light 2020) based at least in part on this tracking information. Additionally, in some examples, control subsystem 2008 may store and utilize historical tracking information (e.g., a history of the tracking information over a given duration, such as the previous second or fraction thereof) to anticipate the gaze angle of eye 2001 (e.g., an angle between the visual axis and the anatomical axis of eye 2001). In some embodiments, eye-tracking subsystem 2006 may detect radiation emanating from some portion of eye 2001 (e.g., the cornea, the iris, the pupil, or the like) to determine the current gaze angle of eye 2001. In other examples, eye-tracking subsystem 2006 may employ a wavefront sensor to track the current location of the pupil.

Any number of techniques may be used to track eye 2001. Some techniques may involve illuminating eye 2001 with infrared light and measuring reflections with at least one optical sensor that is tuned to be sensitive to the infrared light. Information about how the infrared light is reflected from eye 2001 may be analyzed to determine the position(s), orientation(s), and/or motion(s) of one or more eye feature (s), such as the cornea, pupil, iris, and/or retinal blood vessels.

In some examples, the radiation captured by a sensor of eye-tracking subsystem 2006 may be digitized (i.e., converted to an electronic signal). Further, the sensor may transmit a digital representation of this electronic signal to one or more processors (for example, processors associated with a device including eye-tracking subsystem 2006). Eye-tracking subsystem 2006 may include any of a variety of sensors in a variety of different configurations. For example, eye-tracking subsystem 2006 may include an infrared detector that reacts to infrared radiation. The infrared detector may be a thermal detector, a photonic detector, and/or any other suitable type of detector. Thermal detectors may include detectors that react to thermal effects of the incident infrared radiation.

In some examples, one or more processors may process the digital representation generated by the sensor(s) of eye-tracking subsystem 2006 to track the movement of eye 2001. In another example, these processors may track the movements of eye 2001 by executing algorithms represented by computer-executable instructions stored on non-transitory memory. In some examples, on-chip logic (e.g., an application-specific integrated circuit or ASIC) may be used to perform at least portions of such algorithms. As noted, eye-tracking subsystem 2006 may be programmed to use an output of the sensor(s) to track movement of eye 2001. In some embodiments, eye-tracking subsystem 2006 may analyze the digital representation generated by the sensors to extract eye rotation information from changes in reflections. In one embodiment, eye-tracking subsystem 2006 may use corneal reflections or glints (also known as Purkinje images) and/or the center of the eye's pupil 2022 as features to track over time.

In some embodiments, eye-tracking subsystem 2006 may use the center of the eye's pupil 2022 and infrared or near-infrared, non-collimated light to create corneal reflections. In these embodiments, eye-tracking subsystem 2006 may use the vector between the center of the eye's pupil 2022 and the corneal reflections to compute the gaze direction of eye 2001. In some embodiments, the disclosed systems may perform a calibration procedure for an individual (using, e.g., supervised or unsupervised techniques) before tracking the user's eyes. For example, the calibration procedure may include directing users to look at one or more points displayed on a display while the eye-tracking system records the values that correspond to each gaze position associated with each point.

In some embodiments, eye-tracking subsystem 2006 may use two types of infrared and/or near-infrared (also known as active light) eye-tracking techniques: bright-pupil and dark-pupil eye tracking, which may be differentiated based on the location of an illumination source with respect to the optical elements used. If the illumination is coaxial with the optical path, then eye 2001 may act as a retroreflector as the light reflects off the retina, thereby creating a bright pupil effect similar to a red-eye effect in photography. If the illumination source is offset from the optical path, then the eye's pupil 2022 may appear dark because the retroreflection from the retina is directed away from the sensor. In some embodiments, bright-pupil tracking may create greater iris/pupil contrast, allowing more robust eye tracking with iris pigmentation, and may feature reduced interference (e.g., interference caused by eyelashes and other obscuring features). Bright-pupil tracking may also allow tracking in lighting conditions ranging from total darkness to a very bright environment.

In some embodiments, control subsystem 2008 may control light source 2002 and/or optical subsystem 2004 to reduce optical aberrations (e.g., chromatic aberrations and/or monochromatic aberrations) of the image that may be caused by or influenced by eye 2001. In some examples, as mentioned above, control subsystem 2008 may use the tracking information from eye-tracking subsystem 2006 to perform such control. For example, in controlling light source 2002, control subsystem 2008 may alter the light generated by light source 2002 (e.g., by way of image rendering) to modify (e.g., pre-distort) the image so that the aberration of the image caused by eye 2001 is reduced.

The disclosed systems may track both the position and relative size of the pupil (since, e.g., the pupil dilates and/or contracts). In some examples, the eye-tracking devices and components (e.g., sensors and/or sources) used for detecting and/or tracking the pupil may be different (or calibrated differently) for different types of eyes. For example, the frequency range of the sensors may be different (or separately calibrated) for eyes of different colors and/or different pupil types, sizes, and/or the like. As such, the various eye-tracking components (e.g., infrared sources and/or sensors) described herein may need to be calibrated for each individual user and/or eye.

The disclosed systems may track both eyes with and without ophthalmic correction, such as that provided by contact lenses worn by the user. In some embodiments, ophthalmic correction elements (e.g., adjustable lenses) may be directly incorporated into the artificial reality systems described herein. In some examples, the color of the user's eye may necessitate modification of a corresponding eye-tracking algorithm. For example, eye-tracking algorithms may need to be modified based at least in part on the differing color contrast between a brown eye and, for example, a blue eye.

FIG. 21 is a more detailed illustration of various aspects of the eye-tracking subsystem illustrated in FIG. 20. As shown in this figure, an eye-tracking subsystem 2100 may include at least one source 2104 and at least one sensor 2106. Source 2104 generally represents any type or form of element capable of emitting radiation. In one example, source 2104 may generate visible, infrared, and/or near-infrared radiation. In some examples, source 2104 may radiate non-collimated infrared and/or near-infrared portions of the electromagnetic spectrum towards an eye 2102 of a user. Source 2104 may utilize a variety of sampling rates and speeds. For example, the disclosed systems may use sources with higher sampling rates in order to capture fixational eye movements of a user's eye 2102 and/or to correctly measure saccade dynamics of the user's eye 2102. As noted above, any type or form of eye-tracking technique may be used to track the user's eye 2102, including optical-based eye-tracking techniques, ultrasound-based eye-tracking techniques, etc.

Sensor 2106 generally represents any type or form of element capable of detecting radiation, such as radiation reflected off the user's eye 2102. Examples of sensor 2106 include, without limitation, a charge coupled device (CCD), a photodiode array, a complementary metal-oxide-semiconductor (CMOS) based sensor device, and/or the like. In one example, sensor 2106 may represent a sensor having predetermined parameters, including, but not limited to, a dynamic resolution range, linearity, and/or other characteristic selected and/or designed specifically for eye tracking.

As detailed above, eye-tracking subsystem 2100 may generate one or more glints. As detailed above, a glint 2103 may represent reflections of radiation (e.g., infrared radiation from an infrared source, such as source 2104) from the structure of the user's eye. In various embodiments, glint 2103 and/or the user's pupil may be tracked using an eye-tracking algorithm executed by a processor (either within or external to an artificial reality device). For example, an artificial reality device may include a processor and/or a memory device in order to perform eye tracking locally and/or a transceiver to send and receive the data necessary to perform eye tracking on an external device (e.g., a mobile phone, cloud server, or other computing device).

FIG. 21 shows an example image 2105 captured by an eye-tracking subsystem, such as eye-tracking subsystem 2100. In this example, image 2105 may include both the user's pupil 2108 and a glint 2110 near the same. In some examples, pupil 2108 and/or glint 2110 may be identified using an artificial-intelligence-based algorithm, such as a computer-vision-based algorithm. In one embodiment, image 2105 may represent a single frame in a series of frames that may be analyzed continuously in order to track the eye 2102 of the user. Further, pupil 2108 and/or glint 2110 may be tracked over a period of time to determine a user's gaze.

In one example, eye-tracking subsystem 2100 may be configured to identify and measure the inter-pupillary distance (IPD) of a user. In some embodiments, eye-tracking subsystem 2100 may measure and/or calculate the IPD of the user while the user is wearing the artificial reality system. In these embodiments, eye-tracking subsystem 2100 may detect the positions of a user's eyes and may use this information to calculate the user's IPD.

As noted, the eye-tracking systems or subsystems disclosed herein may track a user's eye position and/or eye movement in a variety of ways. In one example, one or more light sources and/or optical sensors may capture an image of the user's eyes. The eye-tracking subsystem may then use the captured information to determine the user's inter-pupillary distance, interocular distance, and/or a 3D position of each eye (e.g., for distortion adjustment purposes), including a magnitude of torsion and rotation (i.e., roll, pitch, and yaw) and/or gaze directions for each eye. In one example, infrared light may be emitted by the eye-tracking subsystem and reflected from each eye. The reflected light may be received or detected by an optical sensor and analyzed to extract eye rotation data from changes in the infrared light reflected by each eye.

The eye-tracking subsystem may use any of a variety of different methods to track the eyes of a user. For example, a light source (e.g., infrared light-emitting diodes) may emit a dot pattern onto each eye of the user. The eye-tracking subsystem may then detect (e.g., via an optical sensor coupled to the artificial reality system) and analyze a reflection of the dot pattern from each eye of the user to identify a location of each pupil of the user. Accordingly, the eye-tracking subsystem may track up to six degrees of freedom of each eye (i.e., 3D position, roll, pitch, and yaw) and at least a subset of the tracked quantities may be combined from two eyes of a user to estimate a gaze point (i.e., a 3D location or position in a virtual scene where the user is looking) and/or an IPD.

In some cases, the distance between a user's pupil and a display may change as the user's eye moves to look in different directions. The varying distance between a pupil and a display as viewing direction changes may be referred to as "pupil swim" and may contribute to distortion perceived by the user as a result of light focusing in different locations as the distance between the pupil and the display changes. Accordingly, measuring distortion at different eye positions and pupil distances relative to displays and generating distortion corrections for different positions and distances may allow mitigation of distortion caused by pupil swim by tracking the 3D position of a user's eyes and applying a distortion correction corresponding to the 3D position of each of the user's eyes at a given point in time. Thus, knowing the 3D position of each of a user's eyes may allow for the mitigation of distortion caused by changes in the distance between the pupil of the eye and the display by applying a distortion correction for each 3D eye position. Furthermore, as noted above, knowing the position of each of the user's eyes may also enable the eye-tracking subsystem to make automated adjustments for a user's IPD.

In some embodiments, a display subsystem may include a variety of additional subsystems that may work in conjunction with the eye-tracking subsystems described herein. For example, a display subsystem may include a varifocal subsystem, a scene-rendering module, and/or a vergence-processing module. The varifocal subsystem may cause left and right display elements to vary the focal distance of the display device. In one embodiment, the varifocal subsystem may physically change the distance between a display and the optics through which it is viewed by moving the display, the optics, or both. Additionally, moving or translating two lenses relative to each other may also be used to change the focal distance of the display. Thus, the varifocal subsystem may include actuators or motors that move displays and/or optics to change the distance between them. This varifocal subsystem may be separate from or integrated into the display subsystem. The varifocal subsystem may also be integrated into or separate from its actuation subsystem and/or the eye-tracking subsystems described herein.

In one example, the display subsystem may include a vergence-processing module configured to determine a vergence depth of a user's gaze based on a gaze point and/or an estimated intersection of the gaze lines determined by the eye-tracking subsystem. Vergence may refer to the simultaneous movement or rotation of both eyes in opposite directions to maintain single binocular vision, which may be naturally and automatically performed by the human eye. Thus, a location where a user's eyes are verged is where the user is looking and is also typically the location where the user's eyes are focused. For example, the vergence-processing module may triangulate gaze lines to estimate a distance or depth from the user associated with intersection of the gaze lines. The depth associated with intersection of the gaze lines may then be used as an approximation for the accommodation distance, which may identify a distance from the user where the user's eyes are directed. Thus, the vergence distance may allow for the determination of a location where the user's eyes should be focused and a depth from the user's eyes at which the eyes are focused, thereby providing information (such as an object or plane of focus) for rendering adjustments to the virtual scene.

The vergence-processing module may coordinate with the eye-tracking subsystems described herein to make adjustments to the display subsystem to account for a user's vergence depth. When the user is focused on something at a distance, the user's pupils may be slightly farther apart than when the user is focused on something close. The eye-tracking subsystem may obtain information about the user's vergence or focus depth and may adjust the display subsystem to be closer together when the user's eyes focus or verge on something close and to be farther apart when the user's eyes focus or verge on something at a distance.

The eye-tracking information generated by the above-described eye-tracking subsystems may also be used, for example, to modify various aspect of how different computer-generated images are presented. For example, a display subsystem may be configured to modify, based on information generated by an eye-tracking subsystem, at least one aspect of how the computer-generated images are presented. For instance, the computer-generated images may be modified based on the user's eye movement, such that if a user is looking up, the computer-generated images may be moved upward on the screen. Similarly, if the user is looking to the side or down, the computer-generated images may be moved to the side or downward on the screen. If the user's eyes are closed, the computer-generated images may be paused or removed from the display and resumed once the user's eyes are back open.

The above-described eye-tracking subsystems may be incorporated into one or more of the various artificial reality systems described herein in a variety of ways. For example, one or more of the various components of system 2000 and/or eye-tracking subsystem 2100 may be incorporated into augmented-reality system 1500 in FIG. 15 and/or virtual-reality system 1600 in FIG. 16 to enable these systems to perform various eye-tracking tasks (including one or more of the eye-tracking operations described herein).

Figure 22:
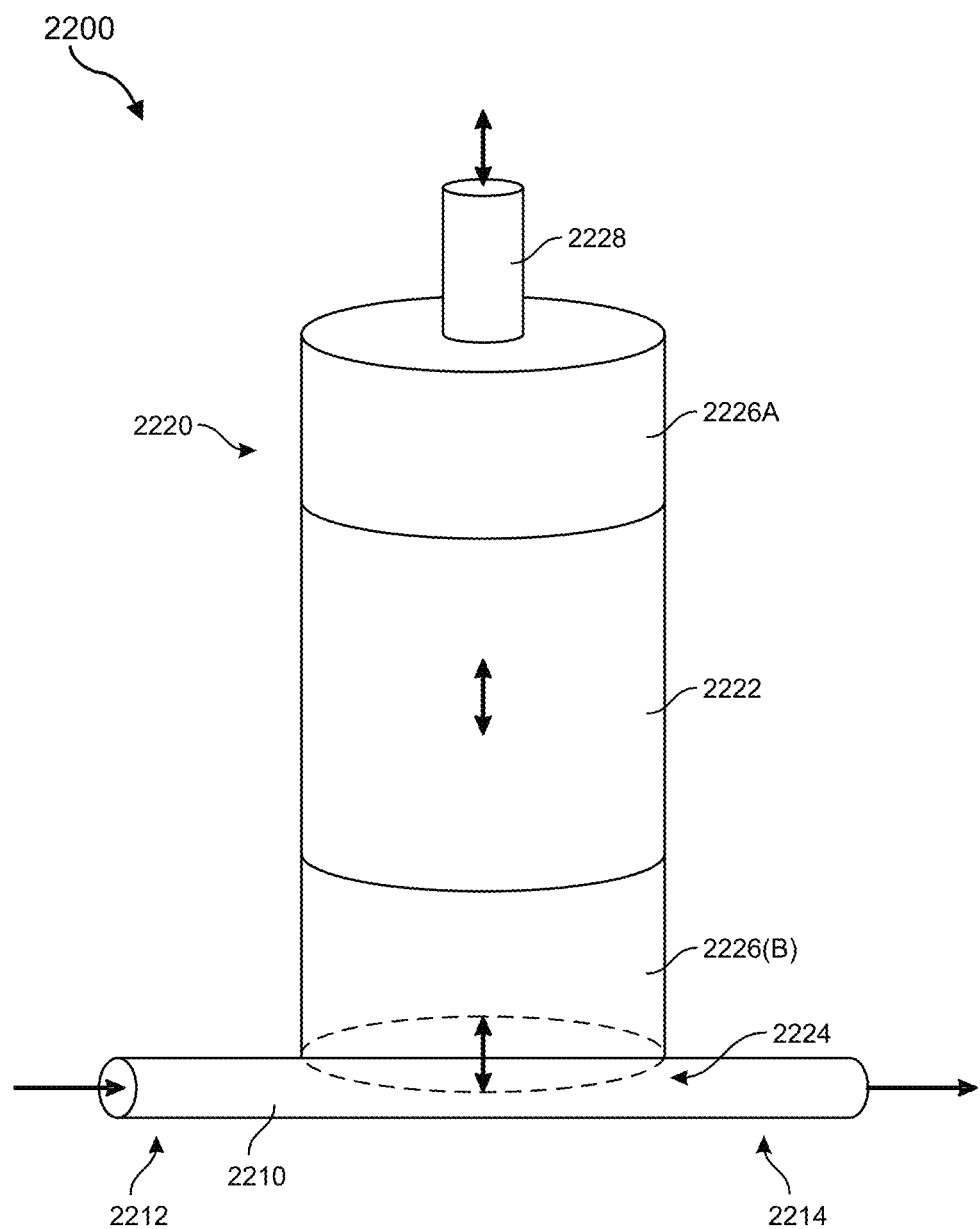
FIG. 22 is an illustration of an exemplary fluidic control system that may be used in connection with embodiments of this disclosure.

As noted above, the present disclosure may also include haptic fluidic systems that involve the control (e.g., stopping, starting, restricting, increasing, etc.) of fluid flow through a fluid channel. The control of fluid flow may be accomplished with a fluidic valve. FIG. 22 shows a schematic diagram of a fluidic valve 2200 for controlling flow through a fluid channel 2210, according to at least one embodiment of the present disclosure. Fluid from a fluid source (e.g., a pressurized fluid source, a fluid pump, etc.) may flow through the fluid channel 2210 from an inlet port 2212 to an outlet port 2214, which may be operably coupled to, for example, a fluid-driven mechanism, another fluid channel, or a fluid reservoir.

Fluidic valve 2200 may include a gate 2220 for controlling the fluid flow through fluid channel 2210. Gate 2220 may include a gate transmission element 2222, which may be a movable component that is configured to transmit an input force, pressure, or displacement to a restricting region 2224 to restrict or stop flow through the fluid channel 2210. Conversely, in some examples, application of a force, pressure, or displacement to gate transmission element 2222 may result in opening restricting region 2224 to allow or increase flow through the fluid channel 2210. The force, pressure, or displacement applied to gate transmission element 2222 may be referred to as a gate force, gate pressure, or gate displacement. Gate transmission element 2222 may be a flexible element (e.g., an elastomeric membrane, a diaphragm, etc.), a rigid element (e.g., a movable piston, a lever, etc.), or a combination thereof (e.g., a movable piston or a lever coupled to an elastomeric membrane or diaphragm).

As illustrated in FIG. 22, gate 2220 of fluidic valve 2200 may include one or more gate terminals, such as an input gate terminal 2226(A) and an output gate terminal 2226(B) (collectively referred to herein as "gate terminals 2226") on opposing sides of gate transmission element 2222. Gate terminals 2226 may be elements for applying a force (e.g., pressure) to gate transmission element 2222. By way of example, gate terminals 2226 may each be or include a fluid chamber adjacent to gate transmission element 2222. Alternatively or additionally, one or more of gate terminals 2226 may include a solid component, such as a lever, screw, or piston, that is configured to apply a force to gate transmission element 2222.

In some examples, a gate port 2228 may be in fluid communication with input gate terminal 2226(A) for applying a positive or negative fluid pressure within the input gate terminal 2226(A). A control fluid source (e.g., a pressurized fluid source, a fluid pump, etc.) may be in fluid communication with gate port 2228 to selectively pressurize and/or depressurize input gate terminal 2226(A). In additional embodiments, a force or pressure may be applied at the input gate terminal 2226(A) in other ways, such as with a piezoelectric element or an electromechanical actuator, etc.

In the embodiment illustrated in FIG. 22, pressurization of the input gate terminal 2226(A) may cause the gate transmission element 2222 to be displaced toward restricting region 2224, resulting in a corresponding pressurization of output gate terminal 2226(B). Pressurization of output gate terminal 2226(B) may, in turn, cause restricting region 2224 to partially or fully restrict to reduce or stop fluid flow through the fluid channel 2210. Depressurization of input gate terminal 2226(A) may cause gate transmission element 2222 to be displaced away from restricting region 2224, resulting in a corresponding depressurization of the output gate terminal 2226(B). Depressurization of output gate terminal 2226(B) may, in turn, cause restricting region 2224 to partially or fully expand to allow or increase fluid flow through fluid channel 2210. Thus, gate 2220 of fluidic valve 2200 may be used to control fluid flow from inlet port 2212 to outlet port 2214 of fluid channel 2210.

Figure 23A:
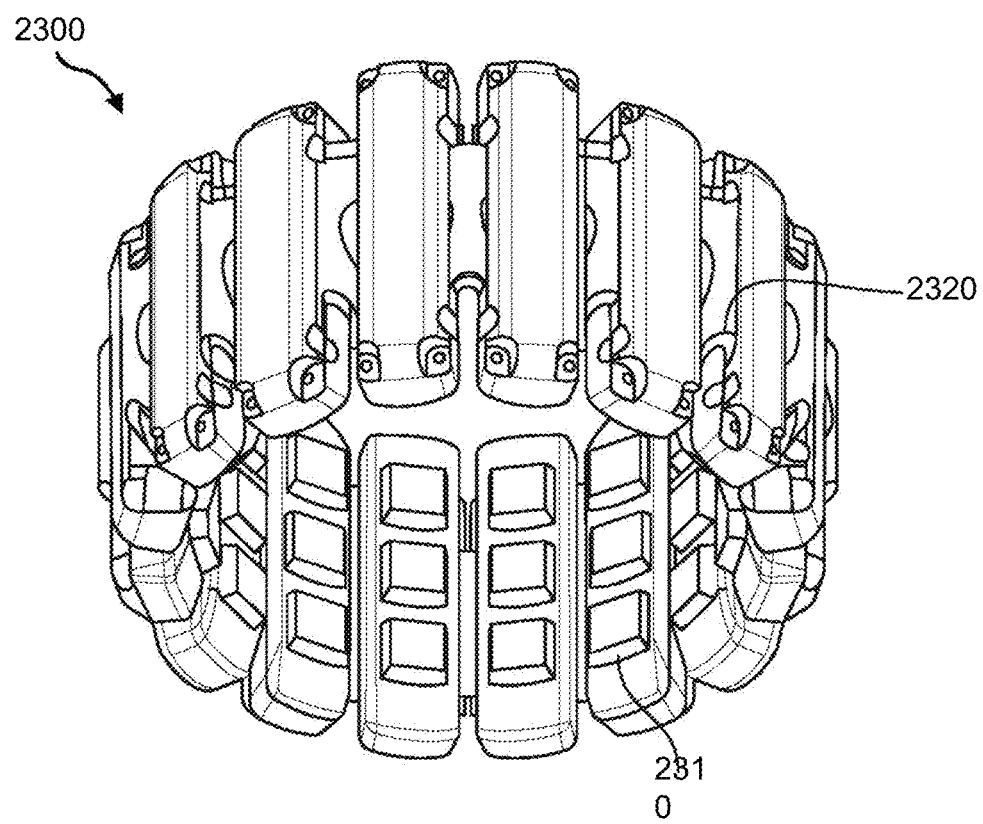
FIGS. 23A and 23B are illustrations of an exemplary human-machine interface configured to be worn around a user's lower arm or wrist.
Figure 23B:
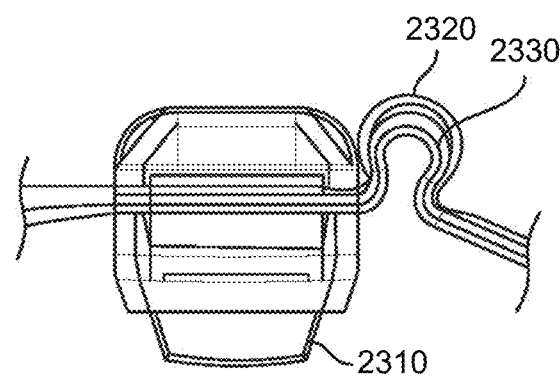

FIG. 23A illustrates an exemplary human-machine interface (also referred to herein as an EMG control interface) configured to be worn around a user's lower arm or wrist as a wearable system 2300. In this example, wearable system 2300 may include sixteen neuromuscular sensors 2310 (e.g., EMG sensors) arranged circumferentially around an elastic band 2320 with an interior surface 2330 configured to contact a user's skin. However, any suitable number of neuromuscular sensors may be used. The number and arrangement of neuromuscular sensors may depend on the particular application for which the wearable device is used. For example, a wearable armband or wristband may be used to generate control information for controlling an augmented reality system, a robot, controlling a vehicle, scrolling through text, controlling a virtual avatar, or any other suitable control task. As shown, the sensors may be coupled together using flexible electronics incorporated into the wireless device. FIG. 23B illustrates a cross-sectional view through one of the sensors of the wearable device shown in FIG. 23A. In some embodiments, the output of one or more of the sensing components may be optionally processed using hardware signal processing circuitry (e.g., to perform amplification, filtering, and/or rectification). In other embodiments, at least some signal processing of the output of the sensing components may be performed in software. Thus, signal processing of signals sampled by the sensors may be performed in hardware, software, or by any suitable combination of hardware and software, as aspects of the technology described herein are not limited in this respect. A non-limiting example of a signal processing chain used to process recorded data from sensors 2310 is discussed in more detail below with reference to FIGS. 24A and 24B.

FIGS. 24A and 24B illustrate an exemplary schematic diagram with internal components of a wearable system with EMG sensors. As shown, the wearable system may include a wearable portion 2410 (FIG. 24A) and a dongle portion 2420 (FIG. 24B) in communication with the wearable portion 2410 (e.g., via BLUETOOTH or another suitable wireless communication technology). As shown in FIG. 24A, the wearable portion 2410 may include skin contact electrodes 2411, examples of which are described in connection with FIGS. 23A and 23B. The output of the skin contact electrodes 2411 may be provided to analog front end 2430, which may be configured to perform analog processing (e.g., amplification, noise reduction, filtering, etc.) on the recorded signals. The processed analog signals may then be provided to analog-to-digital converter 2432, which may convert the analog signals to digital signals that may be processed by one or more computer processors. An example of a computer processor that may be used in accordance with some embodiments is microcontroller (MCU) 2434, illustrated in FIG. 24A. As shown, MCU 2434 may also include inputs from other sensors (e.g., IMU sensor 2440), and power and battery module 2442. The output of the processing performed by MCU 2434 may be provided to antenna 2450 for transmission to dongle portion 2420 shown in FIG. 24B.

Dongle portion 2420 may include antenna 2452, which may be configured to communicate with antenna 2450 included as part of wearable portion 2410. Communication between antennas 2450 and 2452 may occur using any suitable wireless technology and protocol, non-limiting examples of which include radiofrequency signaling and BLUETOOTH. As shown, the signals received by antenna 2452 of dongle portion 2420 may be provided to a host computer for further processing, display, and/or for effecting control of a particular physical or virtual object or objects.

Although the examples provided with reference to FIGS. 23A-23B and FIGS. 24A-24B are discussed in the context of interfaces with EMG sensors, the techniques described herein for reducing electromagnetic interference may also be implemented in wearable interfaces with other types of sensors including, but not limited to, mechanomyography (MMG) sensors, sonomyography (SMG) sensors, and electrical impedance tomography (EIT) sensors. The techniques described herein for reducing electromagnetic interference may also be implemented in wearable interfaces that communicate with computer hosts through wires and cables (e.g., USB cables, optical fiber cables, etc.).

As detailed above, the computing devices and systems described and/or illustrated herein broadly represent any type or form of computing device or system capable of executing computer-readable instructions, such as those contained within the modules described herein. In most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data to be transformed, transform the data, output a result of the transformation to perform a function, use the result of the transformation to perform a function, and store the result of the transformation to perform a function. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and may be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and equivalents in determining the scope of the present disclosure.

Unless otherwise noted, the terms "connected to" and "coupled to" (and derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and derivatives), as used in the specification and claims, are interchangeable with and have the same meaning as the word "comprising."

What is claimed is:

1. A computer-implemented method comprising:
presenting a user interface, the user interface including one or more potential actions;
determining, over a period of time, a probability that a potential action of the one or more potential actions presented within the user interface is an intended action;
quantifying, over the period of time, a value of suggesting the potential action within the user interface based on the probability that the potential action of the one or more potential actions within the user interface is the intended action;
and
in response to the value of suggesting the potential action satisfying a suggestion condition at a selected time within the period of time, presenting a suggestion to perform the potential action within the user interface at the selected time.

2. The computer-implemented method of claim 1, wherein presenting the suggestion to perform the potential action includes highlighting the potential action.

3. The computer-implemented method of claim 1, wherein presenting the suggestion to perform the potential action includes presenting a shortcut to taking the potential action.

4. The computer-implemented method of claim 1, wherein quantifying, over the period of time, the value of suggesting the potential action is further based on an amount of time saved by a user if the potential action were suggested at each given time within the period of time.

5. The computer-implemented method of claim 1, further comprising:
- determining, over a second period of time, a second probability that a second potential action of the one or more potential actions presented within the user interface is a second intended action;
- quantifying, over the second period of time, a second value of suggesting the second potential action within the user interface based on the second probability that the second potential action of the one or more potential actions within the user interface is the second intended action; and
- in response to the second value of suggesting the second potential action satisfying a second suggestion condition at a second selected time within the second period of time, presenting a second suggestion to perform the second potential action within the user interface at the second selected time.

6. The computer-implemented method of claim 1, wherein quantifying, over the period of time, the value of suggesting the potential action is further based on an amount of time lost by a user if the potential action were suggested at each given time within the period of time.

7. The computer-implemented method of claim 1, wherein quantifying the value is further based on a probability that another potential action of the one or more potential actions is the intended action.

8. The computer-implemented method of claim 1, wherein the value of suggesting the potential action satisfying the suggestion condition includes a determination that the value of suggesting the potential action is a maximum value as quantified over the period of time.

9. The computer-implemented method of claim 1, wherein quantifying, over the period of time, the value of suggesting the potential action is further based on a likelihood that a user follows the suggest ion to perform the potential action.

10. The computer-implemented method of claim 1, wherein determining the probability that the potential action within the user interface is the intended action comprises:
- providing, as input to an intention prediction model, at least one user behavior; and
- receiving, as output from the intention prediction model, the probability that the potential action within the user interface is the intended action.

11. The computer-implemented method of claim 10, wherein the at least one user behavior comprises at least one of:
- user eye gaze; or
- user hand movement.

12. The computer-implemented method of claim 10, wherein the input to the intention prediction model further comprises information about past user behavior within the user interface.

13. A system comprising:
- at least one physical processor; and
- physical memory comprising computer-executable instructions that, when executed by the physical processor, cause the physical processor to:
  - cause a user interface to be presented, the user interface including one or more potential action;
  - determine, over a period of time, a probability that a potential action of the one or more potential actions presented within the user interface is an intended action;
  - quantify, over the period of time, a value of suggesting the potential action within the user interface based on the probability that the potential action of the one or more potential actions within the user interface is the intended action;
  - and
  - in response to the value of suggesting the potential action satisfying a suggestion condition at a selected time within the period of time, causing a suggestion to perform the potential action to be presented within the user interface at the selected time.

14. The system of claim 13, wherein causing the suggestion to perform the potential action to be presented includes highlighting the potential action.

15. The system of claim 13, wherein causing the suggestion to perform the potential action to be presented includes presenting a shortcut to taking the potential action.

16. The system of claim 13, wherein quantifying, over the period of time, the value of suggesting the potential action is further based on an amount of time saved by a user if the potential action were suggested at each given time within the period of time.

17. The system of claim 13, wherein the computer-executable instructions further cause the physical processor to:
- determine, over a second period of time, a second probability that a second potential action of the one or more potential actions presented within the user interface is a second intended action;
- quantify, over the second period of time, a second value of suggesting the second potential action within the user interface based on the second probability that the second potential action of the one or more potential actions within the user interface is the second intended action; and
- in response to the second value of suggesting the second potential action satisfying a second suggestion condition at a second selected time within the second period of time, cause a second suggestion to perform the second potential action to be presented within the user interface at the second selected time.

18. The system of claim 1, wherein quantifying, over the period of time, the value of suggesting the potential action is further based on an amount of time lost by a user if the potential action were suggested at each given time within the period of time.

19. The system of claim 1, wherein quantifying the value is further based on a probability that another potential action of the one or more potential actions is the intended action.

20. A non-transitory computer-readable medium comprising one or more computer-executable instructions that, when executed by at least one processor of a computing device, cause the computing device to:
- cause a user interface to be presented, the user interface including one or more potential action;
- determine, over a period of time, a probability that a potential action of the one or more potential actions presented within the user interface is an intended action;
- quantify, over the period of time, a value of suggesting the potential action within the user interface based on the probability that the potential action of the one or more potential actions within the user interface is the intended action;
- in response to the value of suggesting the potential action satisfying a suggestion condition at a selected time within the period of time, causing a suggestion to perform the potential action to be presented within the user interface at the selected time.

\* \* \* \* \*